(12) United States Patent
Liu

(10) Patent No.: US 11,178,037 B2
(45) Date of Patent: Nov. 16, 2021

(54) METHODS AND SYSTEMS THAT DIAGNOSE AND MANAGE UNDESIRABLE OPERATIONAL STATES OF COMPUTING FACILITIES

(71) Applicant: VMware, Inc., Palo Alto, CA (US)

(72) Inventor: Rui Liu, Chicago, IL (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/658,479

(22) Filed: Oct. 21, 2019

(65) Prior Publication Data

US 2020/0052993 A1 Feb. 13, 2020

Related U.S. Application Data

(63) Continuation of application No. 15/612,365, filed on Jun. 2, 2017, now Pat. No. 10,454,801.

(51) Int. Cl.
*H04L 12/26* (2006.01)
*H04L 12/24* (2006.01)

(52) U.S. Cl.
CPC ............ *H04L 43/10* (2013.01); *H04L 41/064* (2013.01); *H04L 41/069* (2013.01)

(58) Field of Classification Search
CPC ...... H04L 41/0873; H04L 41/22; H04L 43/06
See application file for complete search history.

(56) References Cited

U.S. PATENT DOCUMENTS

| | | | |
|---|---|---|---|
| 9,069,737 B1 | 6/2015 | Kimotho et al. | |
| 2004/0260515 A1* | 12/2004 | Wegerich | G05B 17/02 702/182 |
| 2006/0036403 A1* | 2/2006 | Wegerich | G06K 9/00536 702/183 |
| 2013/0002416 A1 | 1/2013 | Herzog | |
| 2013/0024166 A1* | 1/2013 | Herzog | G05B 23/0254 703/2 |
| 2015/0034728 A1 | 12/2015 | Kruglick | |
| 2015/0037058 A1 | 12/2015 | Kureha et al. | |
| 2015/0370587 A1* | 12/2015 | Kureha | G06F 9/45558 718/1 |
| 2016/0147823 A1* | 5/2016 | Noll | G06F 16/2272 707/694 |
| 2017/0039105 A1* | 2/2017 | Shivanna | G06Q 10/20 |
| 2017/0007574 A1 | 3/2017 | Deshpande et al. | |
| 2017/0075744 A1* | 3/2017 | Deshpande | G06F 11/0709 |
| 2017/0084167 A1 | 3/2017 | Bump et al. | |
| 2017/0235629 A1* | 8/2017 | Go | G06F 11/0751 714/57 |

\* cited by examiner

*Primary Examiner* — Nicholas R Taylor
*Assistant Examiner* — Sanjoy K Roy
(74) *Attorney, Agent, or Firm* — Thomas Horstemeyer, LLP

(57) ABSTRACT

The current document is directed to automatically, semi-automatically, and/or manually monitoring a computing facility to detect and address undesirable operational states in computing facilities. The present disclosure employs case-based inference to diagnose and ameliorate undesirable operational states using records of previously handled undesirable operational states and the actions taken to remediate the previously handled undesirable operational states.

20 Claims, 21 Drawing Sheets

```
2013-12-02T10:44:24.095Z li-qe-esx5.vmware.com Rhttpproxy:
[28959B90 verbose 'Proxy Req 46691'] Connected to
localhost:8307
```

```
2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)
```

```
2013-12-02T10:44:24.093Z li-qe-esx5.vmware.com Rhttpproxy:
[2889B90 verbose 'Proxy Req 46685'] The client closed the
stream, not unexpectedly.
```

```
Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -
```

```
2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback
```

```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd
```

```
2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

```
2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59
```

```
2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'
```

```
2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)
```

```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction
```

FIG. 12

| resource | total capacity/amount | current usage | peak usage in last hour | peak usage in last day |
|---|---|---|---|---|
| storage capacity | 360 TB | 33% | 35% | 35% |
| memory | 160 GB | 46% | 55% | 60% |
| CPU | 16 GHz | 82% | 95% | 97% |
| network bandwidth | 10 GB/sec | 42% | 80% | 85% |
| storage bandwidth | 10 GB/sec | 36% | 40% | 44% |

| event | last 10 minutes | last 30 minutes | last hour | last day |
|---|---|---|---|---|
| page faults | 12610 | 40166 | 121632 | 1.31M |
| L1 cache misses | >1M | >1M | >1M | >1M |
| L2 cache misses | 2.6M | 7.7M | 14.1M | 262M |
| L3 cache misses | .12M | .27M | .55M | 7.3M |
| failed packet transmissions | 10 | 42 | 77 | 621 |
| bad-block replacements | 56 | 78 | 216 | 561 |
| application anomalies | 1 | 16 | 23 | 153 |
| disk failures | 0 | 0 | 0 | 0 | example policy: when ∃ resource r for which current usage >90%, offload sufficient VMs so that current usage of resource r <75% example constraint: when ∀ resources r, current usage <85%, execution of new VM can be initiated example threshold: when ∃ resource r for which current usage >95%, issue critical_resource_depletion event

FIG. 15

METHODS AND SYSTEMS THAT DIAGNOSE AND MANAGE UNDESIRABLE OPERATIONAL STATES OF COMPUTING FACILITIES

CROSS-REFERENCE TO RELATED APPLICATIONS

This application is a continuation of and claims the benefit of U.S. patent application Ser. No. 15/612,365, entitled "METHODS AND SYSTEMS THAT DIAGNOSE AND MANAGE UNDESIRABLE OPERATIONAL STATES OF COMPUTING FACILITIES" and filed Jun. 2, 2017, the disclosure of which is expressly incorporated herein by reference in its entirety.

TECHNICAL FIELD

The current document is directed to automatically, semi-automatically, or manually monitoring a computing facility to detect and address undesirable operational states and, in particular, to monitoring methods and systems that employ case-based inference to diagnose and ameliorate undesirable operational states.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. Modern computing systems also provide many different types of monitoring tools and facilities that allow system administrators to obtain detailed information about the current operational state of the computing systems and the operational states of the components of the computer system. With the copious information available to system administrators and to automated and semi-automated system-administration and system-management tools, it would seem that system monitoring and management would be relatively straightforward. However, in general, system management is becoming increasingly challenging as distributed computing systems grow to enormous sizes and as the complexity of individual distributed computer systems, including servers and storage appliances, continues to increase.

SUMMARY

The current document is directed to automatically, semi-automatically, and/or manually monitoring a computing facility to detect and address undesirable operational states in computing facilities, including large distributed computing systems. The currently disclosed monitoring methods and systems employ case-based inference to diagnose and ameliorate undesirable operational states. In disclosed implementations, a database is maintained to store and provide access to records of previously handled undesirable operational states and the actions taken to remediate the undesirable operational state is maintained in order to facilitate case-based reasoning inference.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIG. 15 illustrates example operational-state information that may be maintained within a computing facility by an administration-and-management subsystem.

DETAILED DESCRIPTION

Figure 1:
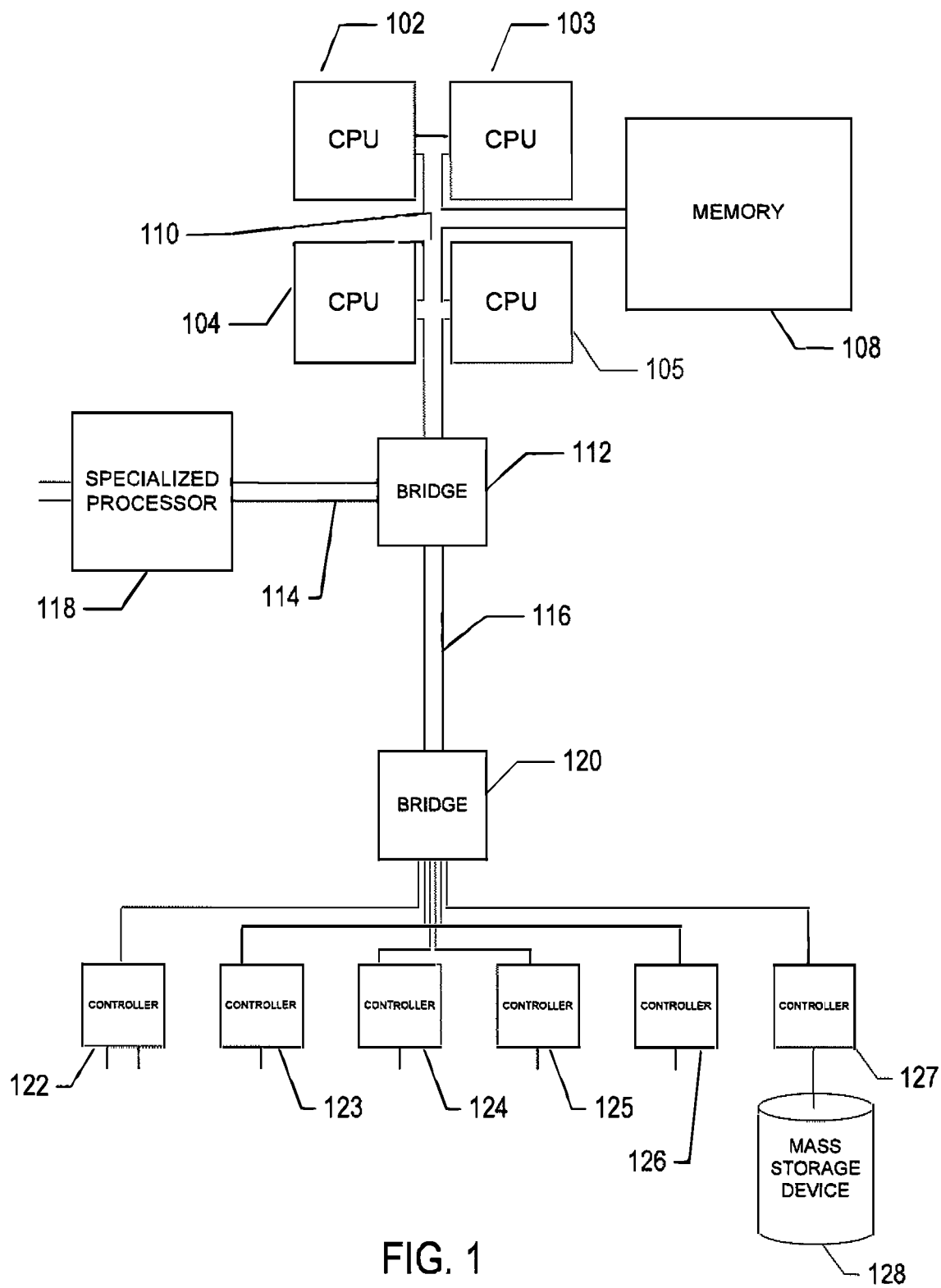
FIG. 1 provides a general architectural diagram for various types of computers.

The current document is directed to automatically, semi-automatically, or manually monitoring a computing facility to detect and address undesirable operational states. The currently disclosed monitoring methods and systems employ case-based inference to diagnose and ameliorate undesirable operational states. In disclosed implementations, a database of previously handled undesirable operational states, along with actions taken to remediate the undesirable operational states, is maintained in order to facilitate case-based reasoning and inference. In a first subsection, below, computer hardware, complex computing systems, and virtualization are reviewed. A second subsection discusses event-message generation and alert generation and distribution. A final subsection discusses the currently disclosed methods and systems for monitoring and managing computing facilities.

Computer Hardware, Complex Computing Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
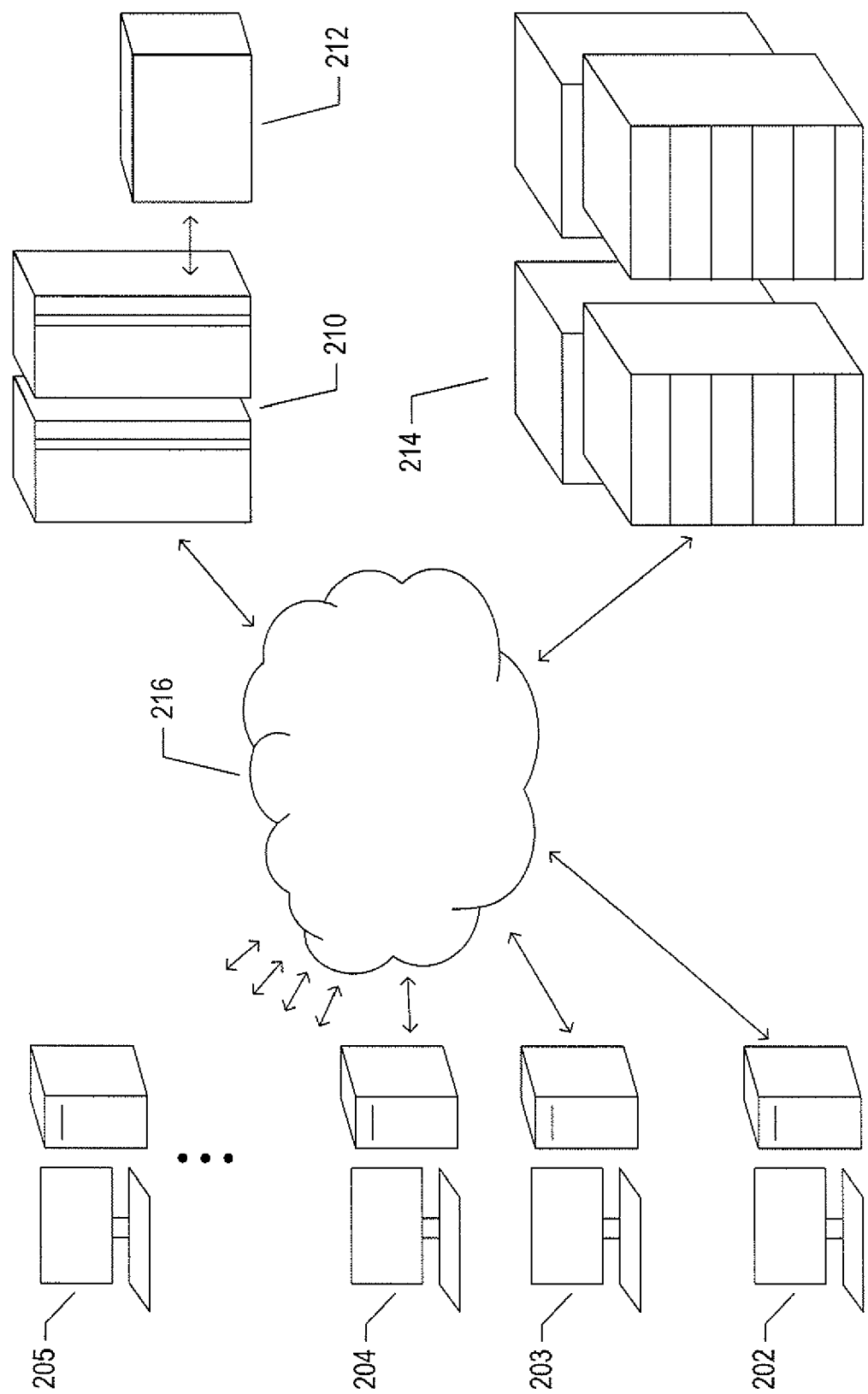
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
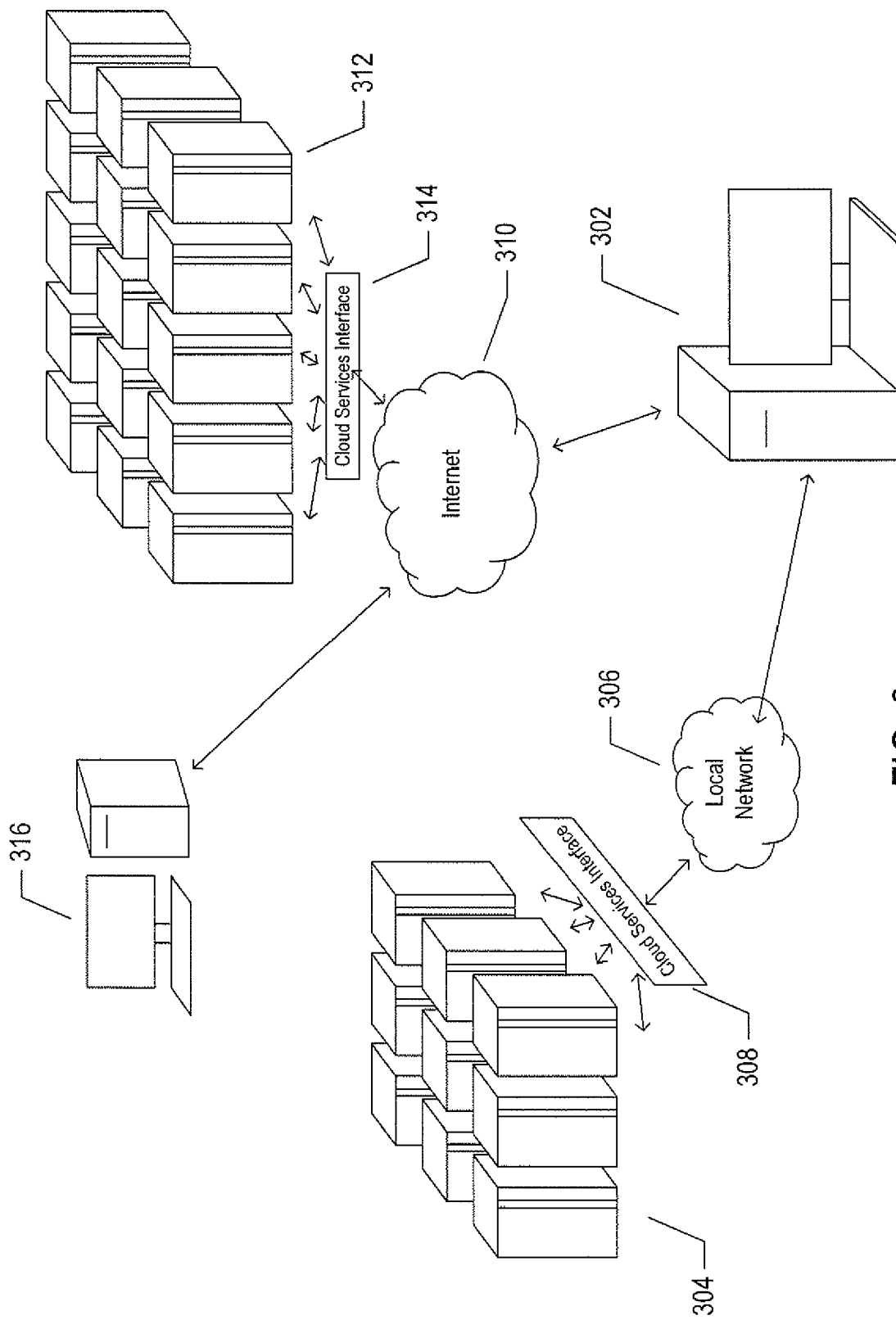
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
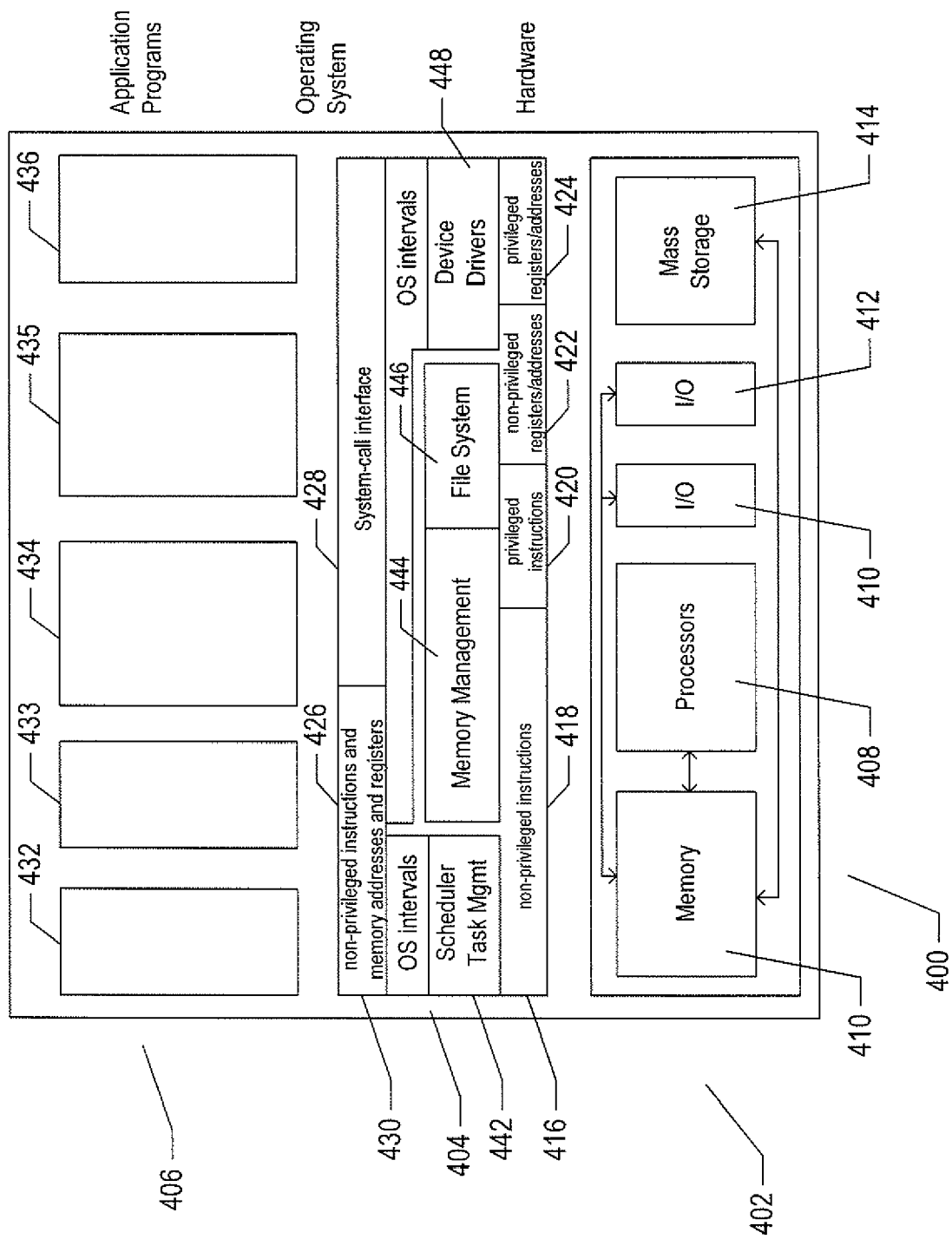
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
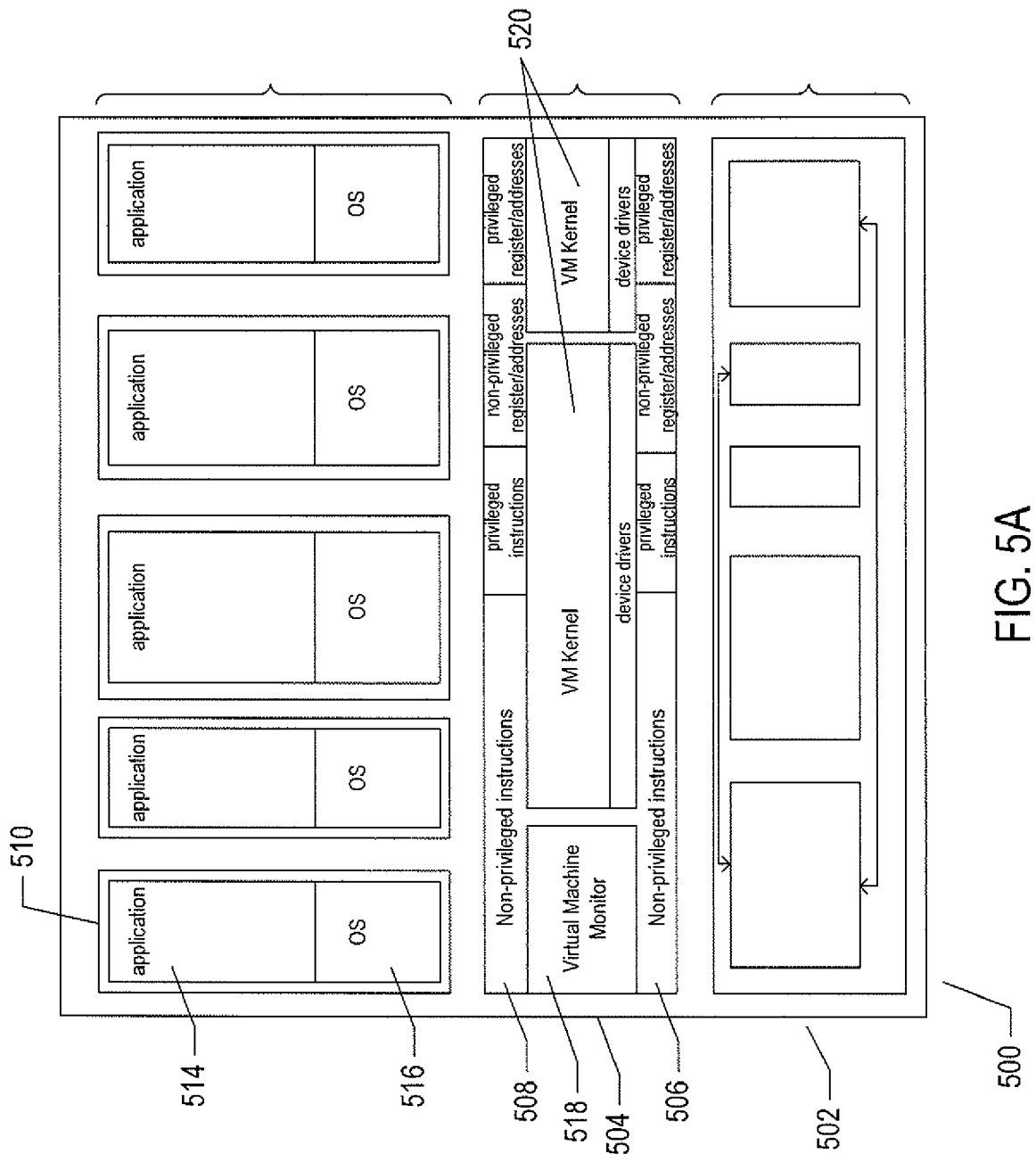
FIGS. 5A-B illustrate two types of virtual machine and virtual-machine execution environments.
Figure 5B:
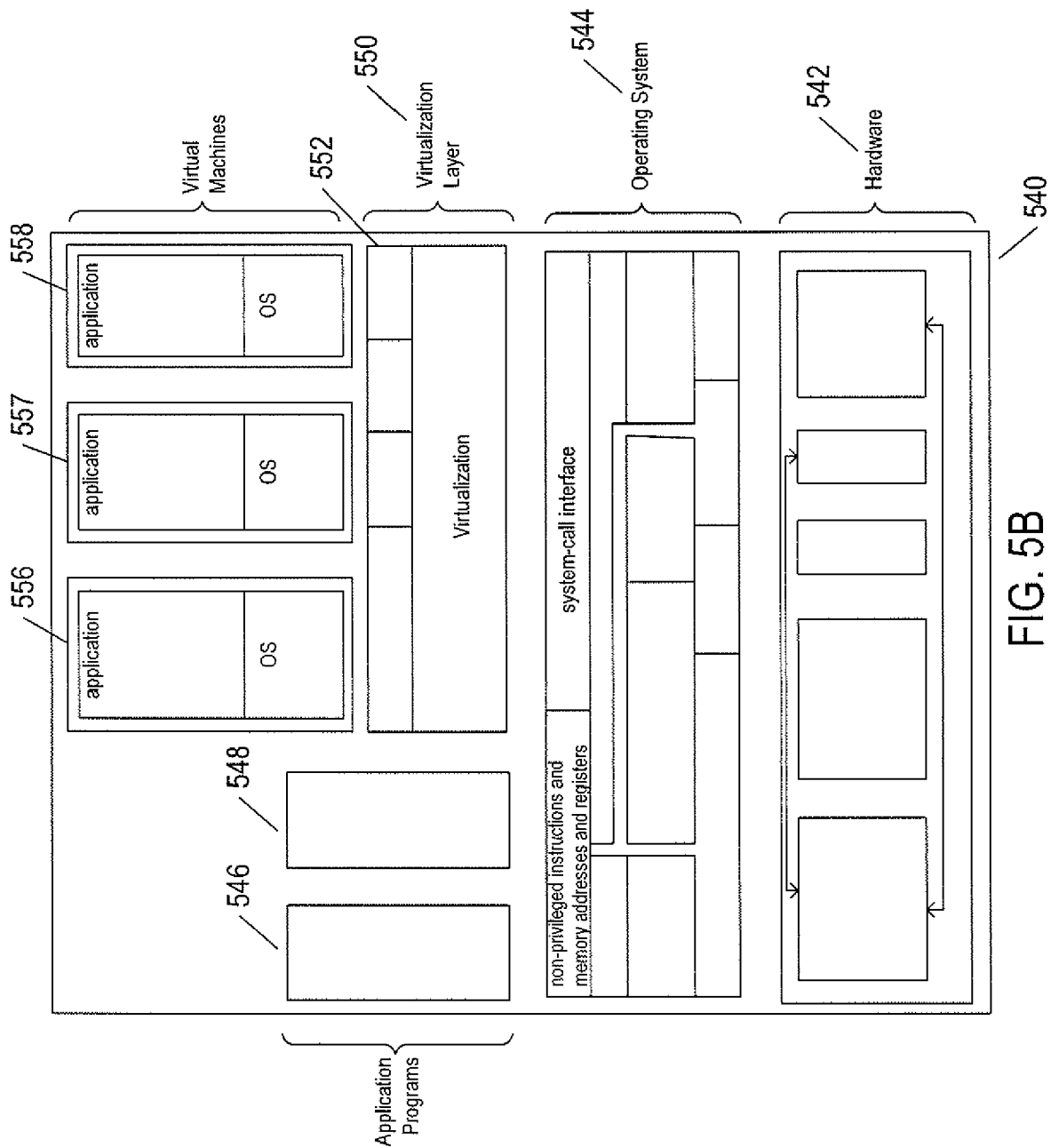

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
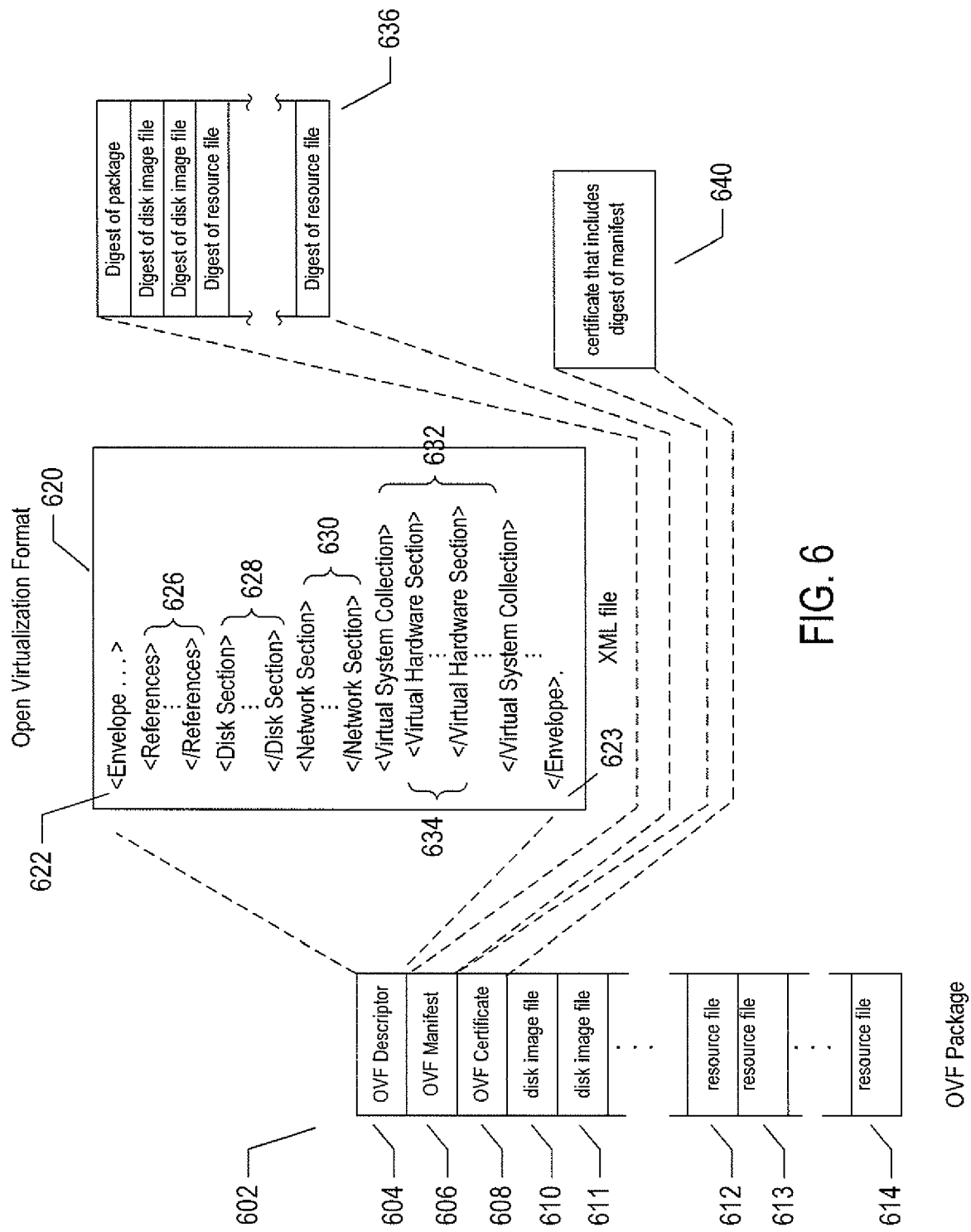
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML, document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
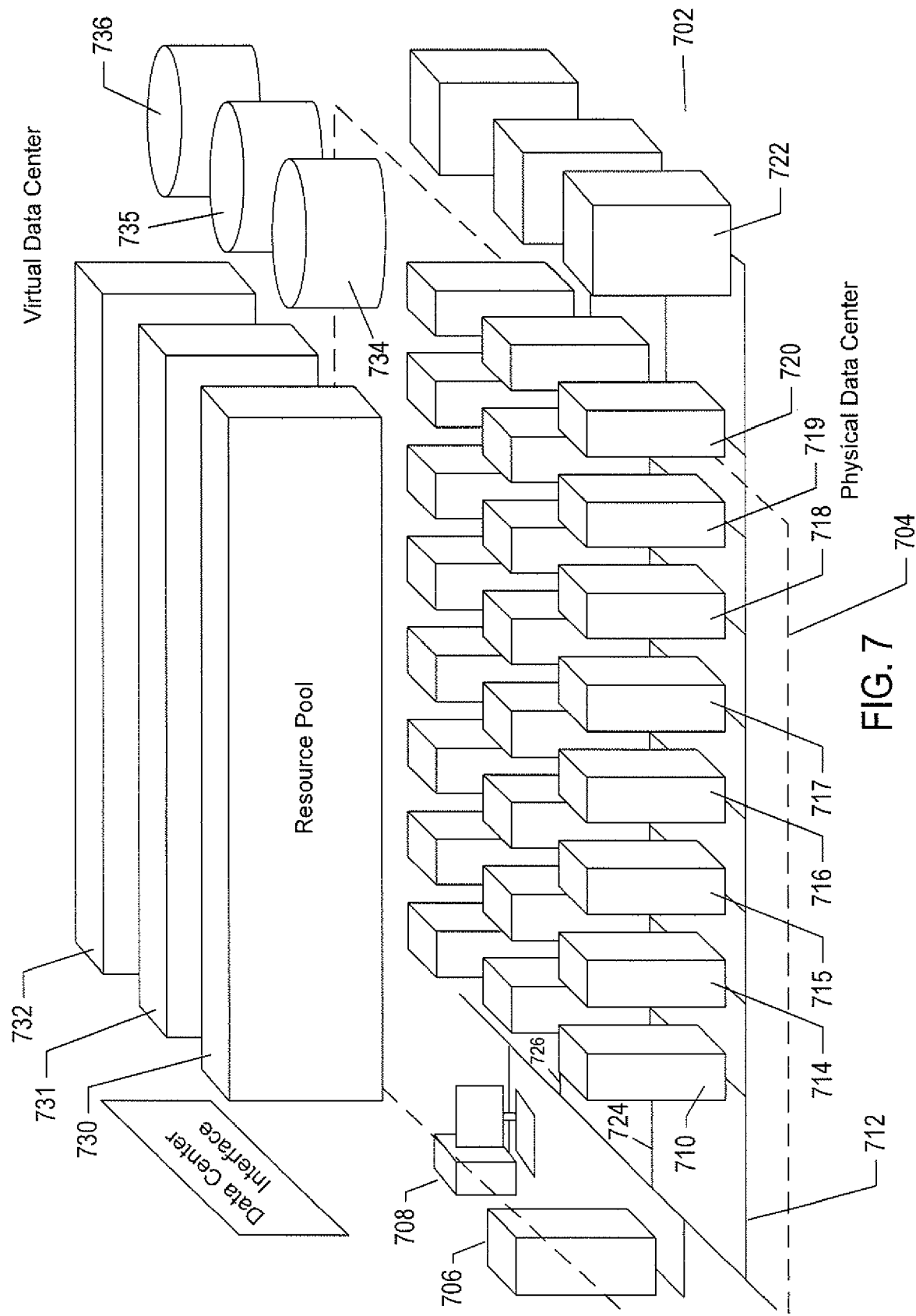
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
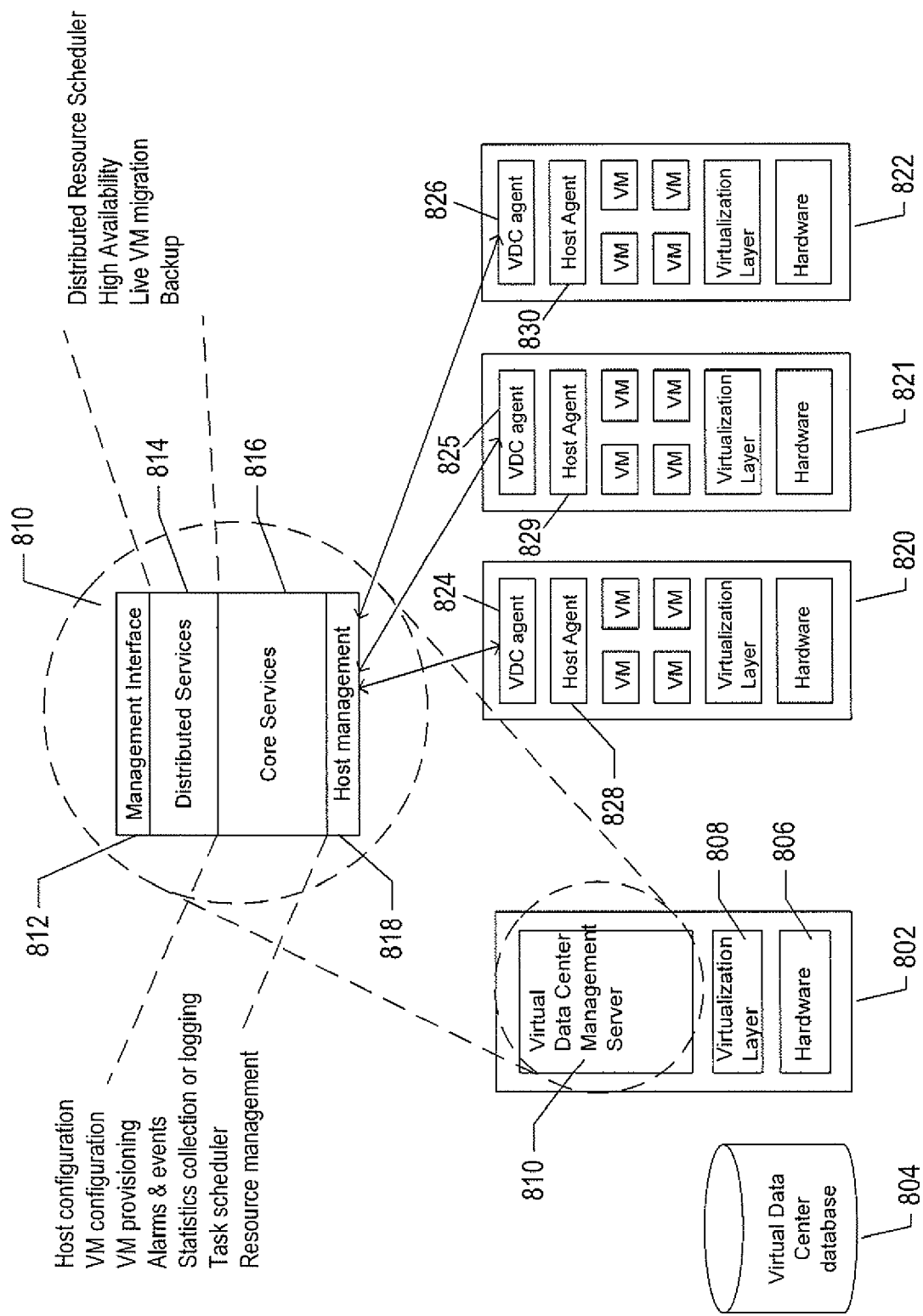
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
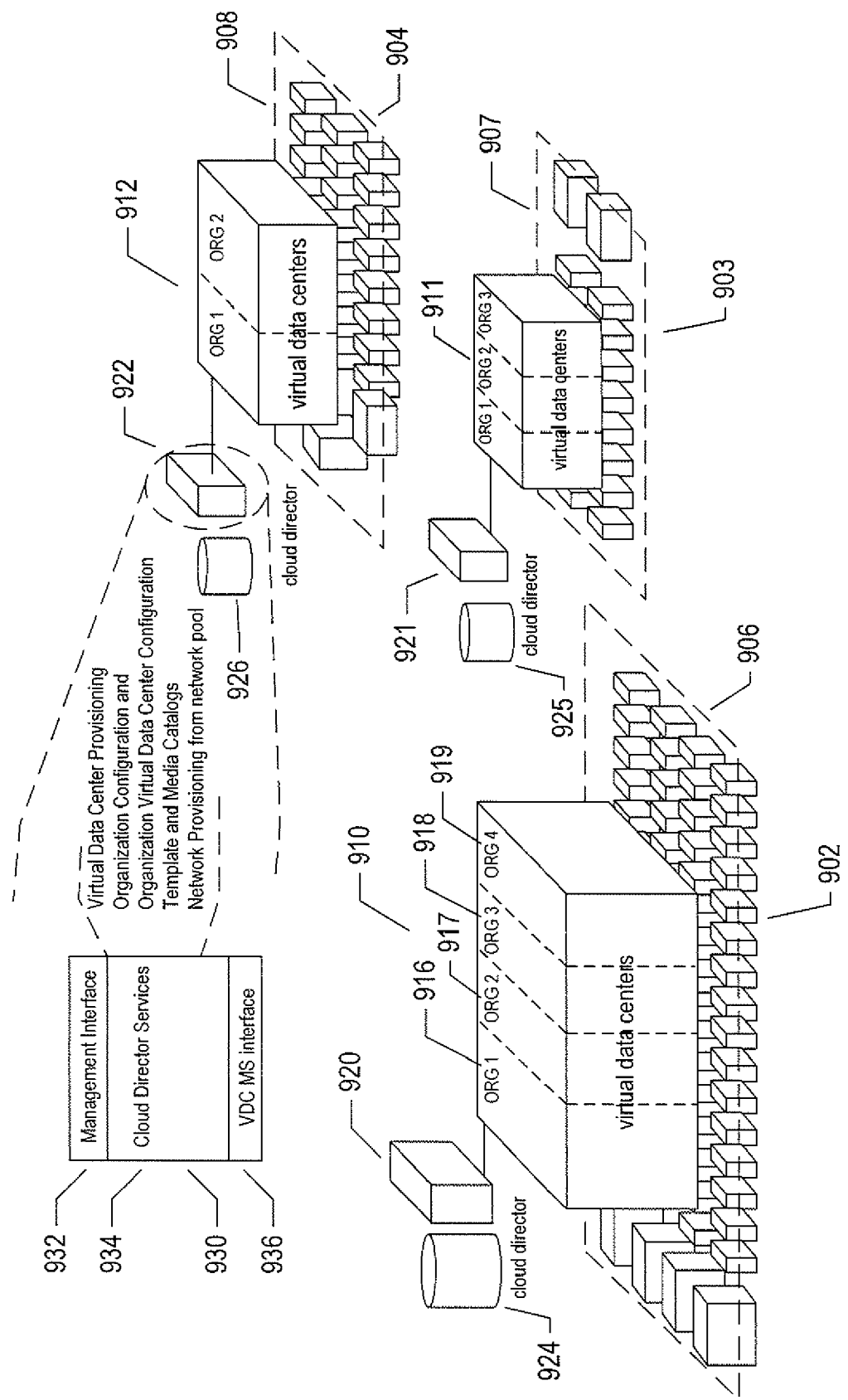
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
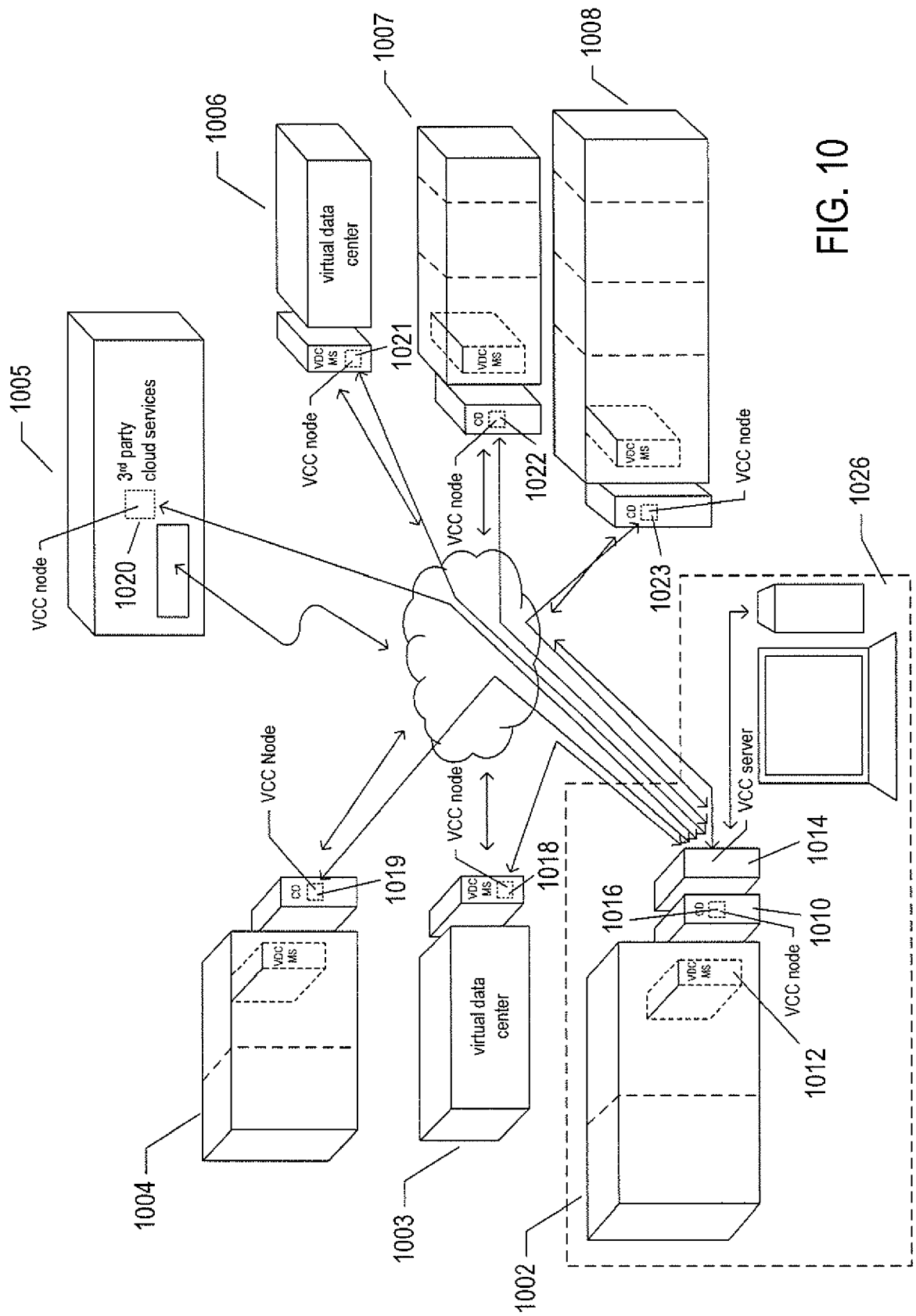
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Generation and Alert Generation and Distribution

Figure 11:
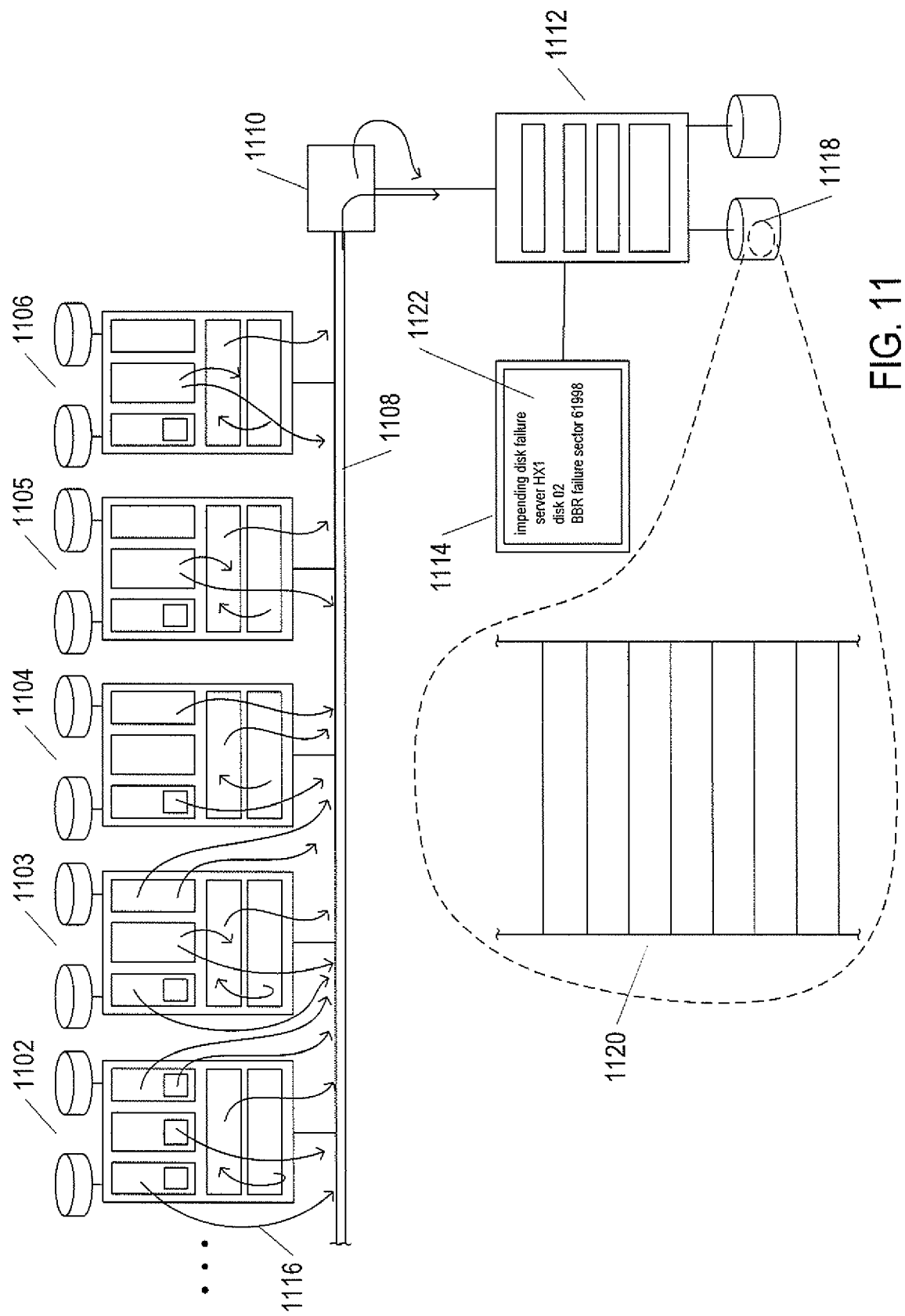
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

Figure 13:
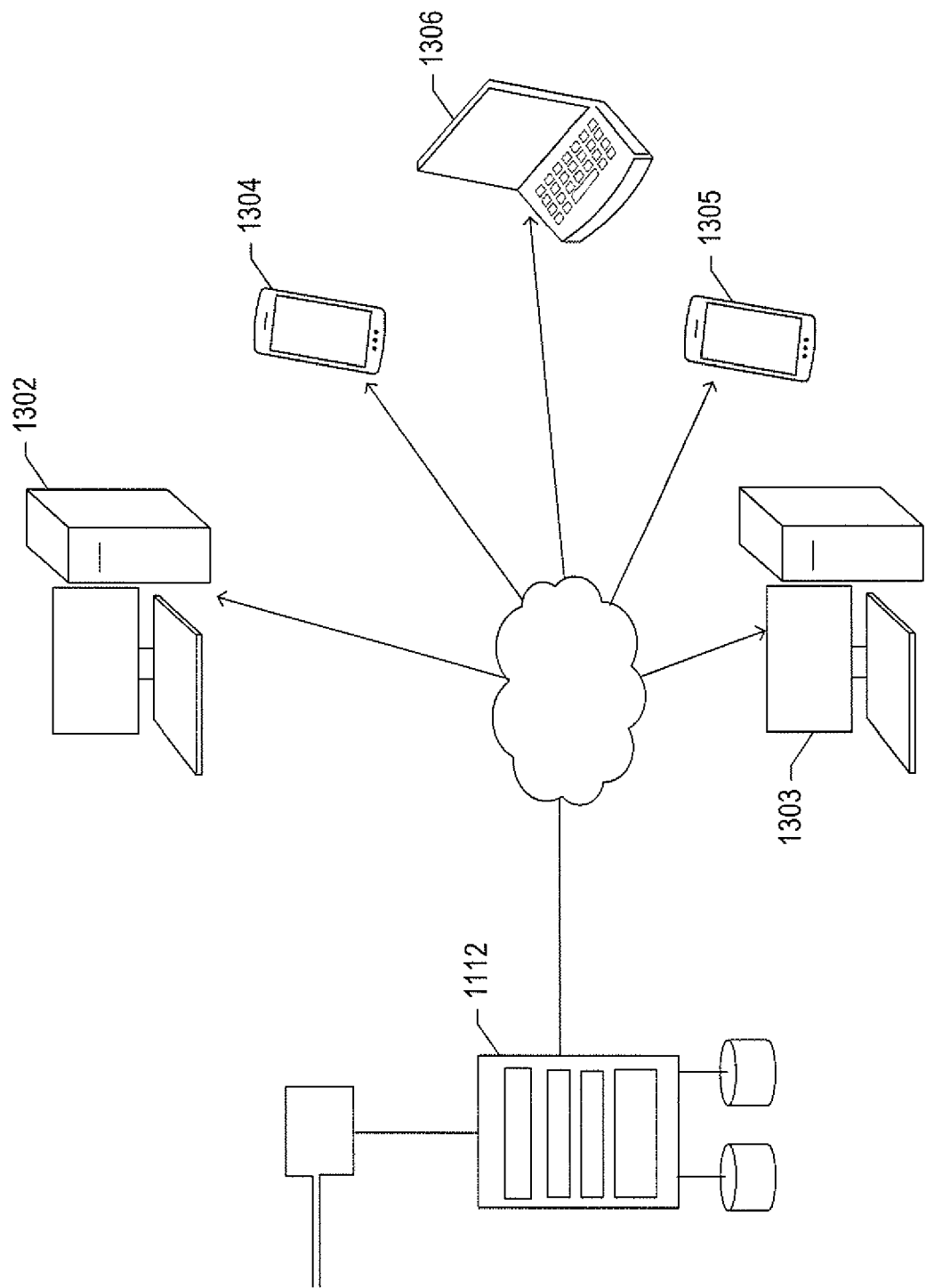
FIG. 13 illustrates the distribution of alerts from a distributed computer system to system-administration-personnel devices.
Figure 14:
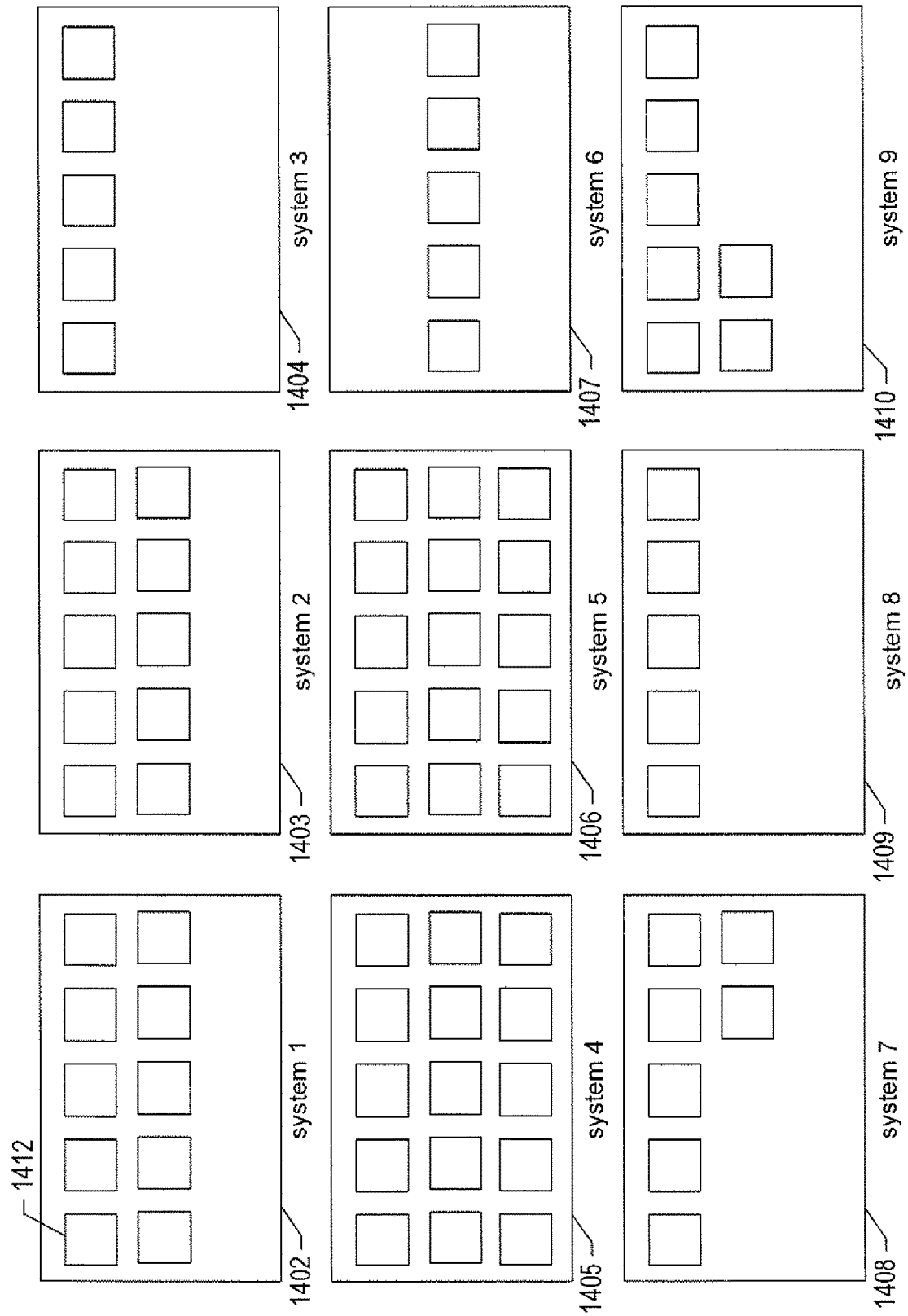
FIG. 14 illustrates a small computing facility that includes nine individual computer systems 1402-1410.

FIG. 13 illustrates the distribution of alerts from a distributed computer system to system-administration-personnel devices. The administration computer 1112, previously discussed with reference to FIG. 11, is shown on the left-hand side of FIG. 13. In addition to logging events corresponding to received event messages, the administration computer monitors incoming event messages and initiates generation of alert-messages for certain of the event messages that report the occurrences of serious events that need the attention of system-administration personnel. In certain implementations, the administration computer itself includes an alert-generation-and-distribution subsystem to which the event-processing system issues alert-initiation requests, while, in other implementations, the administration computer generates alert-initiation messages and transmits the alert-initiation messages to an alert-generation-and-distribution-subsystem component of the distributed computer system or to a remote alert-generation-and-distribution system that distributes alert messages to system-administration-personnel devices. As shown in FIG. 13, alert messages may be distributed to personal computers and workstations 1302-1303, cell phones 1304-1305, laptops and tablets 1306, and to many other types of electronic devices, including pagers and land-line phones. An alert-generation-and-distribution system or subsystem may include complex logic for identifying the appropriate recipients for a particular alert, identifying to which of the recipients' devices to transmit alert messages, identifying times of day at which to send alert messages to particular recipients, and identifying the frequency of alert-message retransmission in the case that alert messages are not received in a timely fashion. Alert messages provide rapid notification to engineers and system administrators of the occurrence of potentially serious events that, if not handled in a timely fashion, may lead to system degradation or failure. In certain systems, alert messages may additionally be sent to automated system-maintenance and system-administration subsystems that can undertake corrective and ameliorative actions for certain types of reported events without human intervention Monitoring and Undesirable-Operational-State Remediation Via Case-Based Inference FIG. 14 illustrates a small computing facility that includes nine individual computer systems 1402-1410. The computer facility may be a physical data center, a virtual data center, or one node of a larger distributed data center, in this example. However, the phrase "computing facility" may additionally be used to describe a single computing system. At a given point in time, each computer system within the computing facility runs a set of virtual machines. For example, in the example shown in FIG. 14, computer system 1402 is currently running a set of 10 virtual machines. Each virtual machine is represented by a small square, such as square 1412. The current operational state of the computing facility includes the type and current operational state of each virtual machine running within each computer system. In addition, the current operational state of the computing facility includes the computational resources currently allocated to, and used by, each virtual machine, the physical configuration of each component computer system, including the numbers of each type of hardware component, the total capacities of each computational resource within each component computer system, the type of the virtualization system used in each component computer system, the current contents of memory and mass-storage devices within each component computer system and within any data-storage appliances, and many other such characteristics and parameters. There are many sources of information regarding the operational state of a computing facility, including event-message logs, administration tools and management tools at many different levels within the computing facility, configuration information stored in configuration files, and information accessible by querying various different interfaces provided by both hardware and software components.

FIG. 15 illustrates example operational-state information that may be maintained within a computing facility by an administration-and-management subsystem. This operational-state information includes computational-resource-usage information, shown in table 1502, and event-occurrence statistics, shown in table 1504. The computational-resource-usage information includes a row, or record, for each different type of computational resource monitored by the administration-and-management subsystem. For example, row 1506 contains information about the mass-storage computational resource. The example information includes an indication of the total capacity or amount of the computational resource 1508, the fraction of the total capacity or amount of the resource currently used 1510, the greatest fraction of the capacity or amount of the resource used within the preceding half hour 1512, referred to as the "peak usage" during the preceding half hour, and the peak usage during that preceding day 1514. This information is maintained for each of the multiple computational resources represented by rows in table 1502. Each computational resource may be distributed across many physical devices and computer systems, in the case that the tables apply to the computing system in its entirety, or may represent resource usage within a single component computer system, with the administration-and-management subsystem maintaining multiple tables, one for each component computer system. The tables may be logical tables, access to which triggers execution of operating-system or virtualization-layer commands that return the desired data. In any particular implementation, different and/or additional types of operational-state information may be maintained for each of many different types of computational resources. The event-occurrence information, accumulated in table 1504, includes information with respect to each of many different types of events, each event type represented by a row in table 1504. In the example table shown in FIG. 15, the number of each type of event within the preceding 10 minutes 1516, the preceding 30 minutes 1518, preceding hour 1520, and the preceding day 1522 is provided in separate fields within each row or record. Various of the events are system events that may be generated by computer-facility-monitoring subsystems, as discussed above with reference to FIGS. 11-13. Certain of these events may generate alerts and/or may invoke automated or semi-automated event-handling mechanisms.

Automated, semi-automated, and manual system-administration methods and systems may employ a variety of different policies, constraints, and thresholds to facilitate monitoring and management of the computer facility. FIG. 15 shows an example policy 1524, an example constraint 1526, and an example threshold 1528. The example policy 1524 is an encoding of a rule that, when the current usage of a particular computational resource within a computing facility exceeds 90% of the total capacity or amount of the computational resource, virtual machines are offloaded until usage of the computational resource to fall below 75%. During system monitoring, policies are evaluated and implemented. The evaluation and implementation may involve fully automated, semi-automated, and manual administrative operations. The example constraint 1526 is an encoding of a rule that execution of a new virtual machine can be initiated within a computer system when the current usage of each of the computational resources within the computer system is below 85% of the total capacity or amount of the computational resource. The constraints are evaluated prior to carrying out an administrative task, such as initiating execution of a new virtual machine. The example threshold 1528 is an encoding of a rule that when the current usage of a computational resource exceeds 95%, a critical-resource-depletion event is generated. Generation of such events often result in triggering of alerts to inform administration personnel of the situation, to invoke automated event-handling methods for handling the situation, or both.

The current document is directed to methods and systems that employ case-based reasoning and inference to automate most of, or portions of, computing-facility operational-state monitoring and amelioration of undesirable, detected operational states. To facilitate discussion of these methods and systems, a simple alert-based administrative monitoring-and-management subsystem is used as an example operational-state-monitoring subsystem within a computing facility. Events are generated and accumulated within an administrative computer system, as discussed above with reference to FIGS. 11-13. When certain thresholds are breached, or other event-initiation conditions obtain, alerts are generated and distributed to automated and/or semi-automated administrative subsystems and, depending on the criticality or priority of the events, to administrative personnel. The automated and/or semi-automated administrative systems may, in certain implementations, take certain automated actions to ameliorate undesirable computational states. However, for most higher-priority and critical events, human administrators are generally alerted to evaluate, diagnose, and respond to detected undesirable computational states. In many current systems, administrative personnel employ their personal experience and knowledge in diagnosing and handling the occurrences of undesirable computational states. They may, in many cases, also employ operational manuals, consultations with other administrative personnel, engineers, or experts, and may carry out trial-and-error procedures in order to take actions that drive the operational state of the computing facility back to an acceptable operational state. Unfortunately, these types of techniques are prone to error, unacceptable delays, and suboptimal handling of undesirable computational states. This is because even relatively small computing facilities are exceedingly complex, with enormous numbers of possible operational states and enormous numbers of different steps and actions that can be undertaken to change the operational states of the computing facilities. As a result, few undesirable computational states can be straightforwardly and deterministically diagnosed, and few diagnoses lead straightforwardly to effective ameliorative actions and procedures. The problem domain is simply too complex and the relevant data is too sparse.

One approach to addressing complex problem domains associated with sparse descriptive and diagnostic information is to use case-based reasoning and inference. In general, case-based reasoning and inference uses stored information regarding previously observed states and previously applied remedies to address undesirable states in order to infer effective approaches to remediating currently detected undesirable operational states. In order to automate and effectively apply case-based reasoning and inference to system administration, this type of stored information needs to be collected in a database or repository that is accessible to automated monitoring and management tools as well as to system administrators. In addition, various types of metrics are needed for comparing computing-facility operational states and determining whether a given computing-facility operational state is acceptable.

Figure 16:
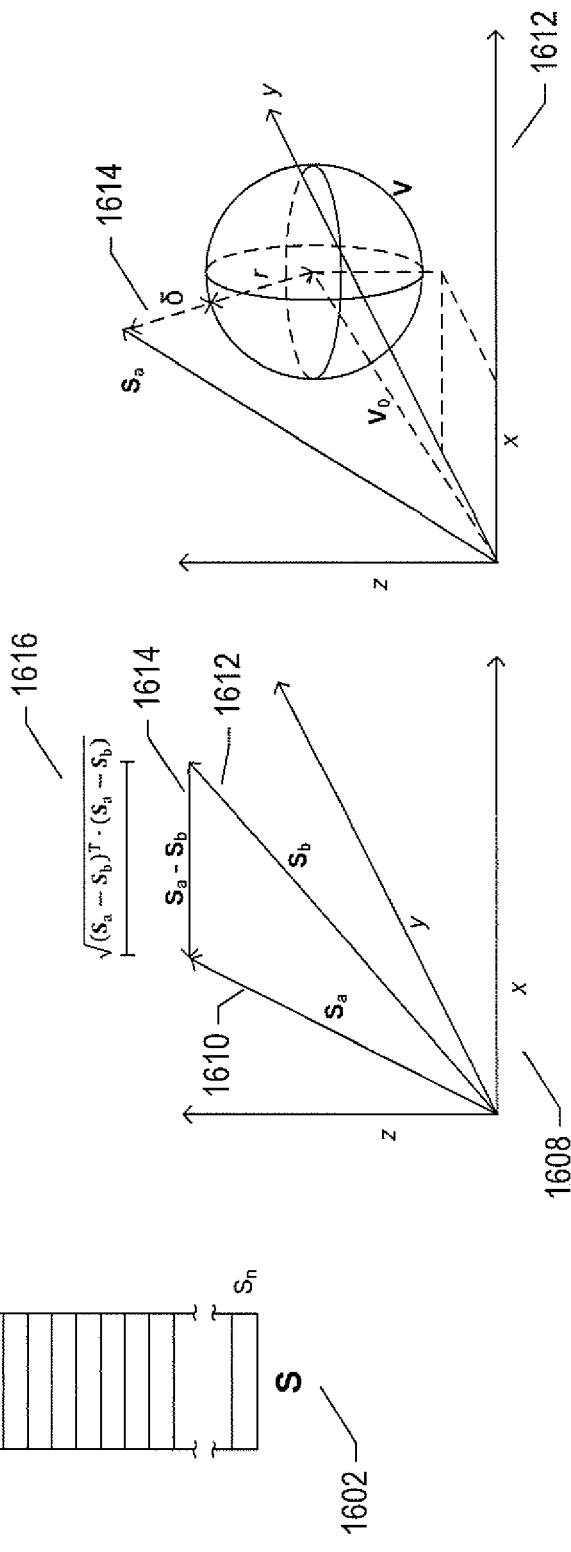
FIG. 16 illustrates several metrics use to implement case-based administration of computer systems.

FIG. 16 illustrates several metrics use to implement case-based administration of computer systems. First, a system-operational-state snapshot that is used to capture a current state of a computer system is shown as a vector S 1602. The vector S has multiple components $S_1, S_2, \ldots, S_n$ each shown, in FIG. 16 as a cell, such as cell 1604 corresponding to component $S_1$. Each component of the snapshot vector S is a numeric operational-state parameter, such as the numeric values shown in tables 1502 and 1504, discussed above with reference to FIG. 15. The same operational-state parameters, in the same order, are used for each snapshot vector representing an operational-state snapshot of the computing system at each point in time. Operational-state parameters are selected for inclusion in the snapshot vector for their ability to contribute to fine-grained differentiation between the many different possible operational states of the computer system. An operational-state parameter that is relatively constant, in value, during long periods of time is less desirable than an operational-state parameter that assumes values over a wide value range and that changes, in value, relatively frequently. Operational-state parameters that assume particular values for undesirable operational states of the computing system that differ from values assumed by the operational-state parameter for acceptable and desirable operational states, and that thus provide clear differentiation between normal operational states and undesirable operational states, are of particular value for inclusion in snapshot vectors. The operational-state parameters selected for inclusion in the snapshot vector may include values indicative of the configuration of the computing facility, including the numbers and types of virtual machines running within computer systems of the computing facility, the hardware components of the computer systems within the computing facility, and other such configuration information. The operational-state parameters selected for inclusion in the snapshot vector may additionally include computational-resource-usage values, event statistics, various metrics associated with latencies and throughput of particular components and subsystems, various metrics associated with defined computational tasks, and other such parameter and operational values. The information from which snapshot-vector components are selected may be obtained through various types of computing-facility monitoring subsystems, from computing-facility configuration information, from event logs, and from a variety of other sources.

A first metric used in the described implementation is a similarity metric that reflects the comparison between two snapshot vectors. The similarity metric σ is shown, in expression 1606, to be the square root of the scalar product of the difference between the two snapshot vectors being compared. The meaning of this expression is illustrated in plot 1608 in FIG. 16. The first snapshot vector $S_a$ 1610 is compared with a second snapshot vector $S_b$ 1612. Subtraction of snapshot vector $S_b$ be from snapshot vector $S_a$ produces the difference vector 1614 directed from the head of snapshot vector $S_b$ to the head of snapshot vector $S_a$. The square root of the scalar product of the difference vector with itself 1616 is the length of the difference vector. A snapshot vector represents a point in an n-dimensional space, where n is the number of components in the snapshot vector. Points within this n-dimensional space represent different operational states of the computer system. The similarity metric σ for two snapshot vectors is therefore the distance, in operational-state space, between two different operational states. When the distance is 0, the two snapshot vectors are identical. As the distance increases, the difference between the two snapshot vectors increases. Thus, a σ-metric value of 0 indicates identity, and σ-metric values of increasing magnitude indicate increasing dissimilarity between two snapshot vectors and between the computing-facility operational states represented by the two snapshot vectors.

A second metric used in the described implementation is a desirability metric that reflects the desirability of an operational state represented by a snapshot vector. In this described implementation, it is assumed that the set of desirable operational states inhabit a compact, well-defined volume within the n-dimensional operational-state space. Furthermore, it is assumed that a spherical volume V can be constructed within the desirable-operational-state volume. The center or centroid of the constructed volume V equal to the centroid of the desirable-operational-state volume. As represented by expression 1610 in FIG. 16, the desirability metric δ for an operational state represented by the snapshot vector $S_a$ is 0 when the operational state represented by $S_a$ is within the volume V and is otherwise equal to the distance from the operational state represented by $S_a$ to the surface of the volume V. Plot 1612 in FIG. 16 illustrates computation of the desirability metric δ for a snapshot vector $S_a$ when the point in n-dimensional operational-state space represented by $S_a$ is outside of volume V. The distance from the point in n-dimensional operational-state space represented by vector $S_a$ to the surface of volume V 1614 is equal to the length of the vector obtained by subtracting the vector $V_c$ that represents the centroid of the volume V from the vector $S_a$ a and then subtracting the radius of the volume V from this length. The desirability metric δ can also be obtained as the similarity metric σ for vectors $S_a$ and $V_c$ minus the radius of the volume V. The value of the metric δ is 0 for acceptable or desirable operational states and increases as the desirability of an operational state decreases. The phrases "desirable operational state" and "undesirable operational state" are used to partition the possible operational states of a computing facility into a first set of operational states. referred to as "desirable operational states" or "acceptable operational states," that do not to be addressed or ameliorated by administrative intervention, and a second set of operational states. referred to as "undesirable operational states" or "unacceptable operational states," that represent potentially harmful operational states that need to be addressed, or handled, by administrative intervention. In the disclosed implementation, an operational state is quantitatively and deterministically determined to be either desirable or undesirable, equivalent to determining whether or not the operational state is acceptable or unacceptable, by generating a snapshot vector, generating one or more desirability metrics from the snapshot vector, and comparing the values of one or more desirability metrics to corresponding threshold values.

There are, of course, many different possible similarity and desirability metrics that can be used to implement a case-based monitoring and event-handling administration subsystem. The currently described similarity metric σ and desirability metric δ are simple and functional examples. The desirability metric δ is useful for well-behaved n-dimensional operational-state spaces for which a suitable volume V can be defined. This quality of the desirability metric does, however, depend on the types of operational-state parameters chosen as components for the snapshot vectors.

Figure 17:
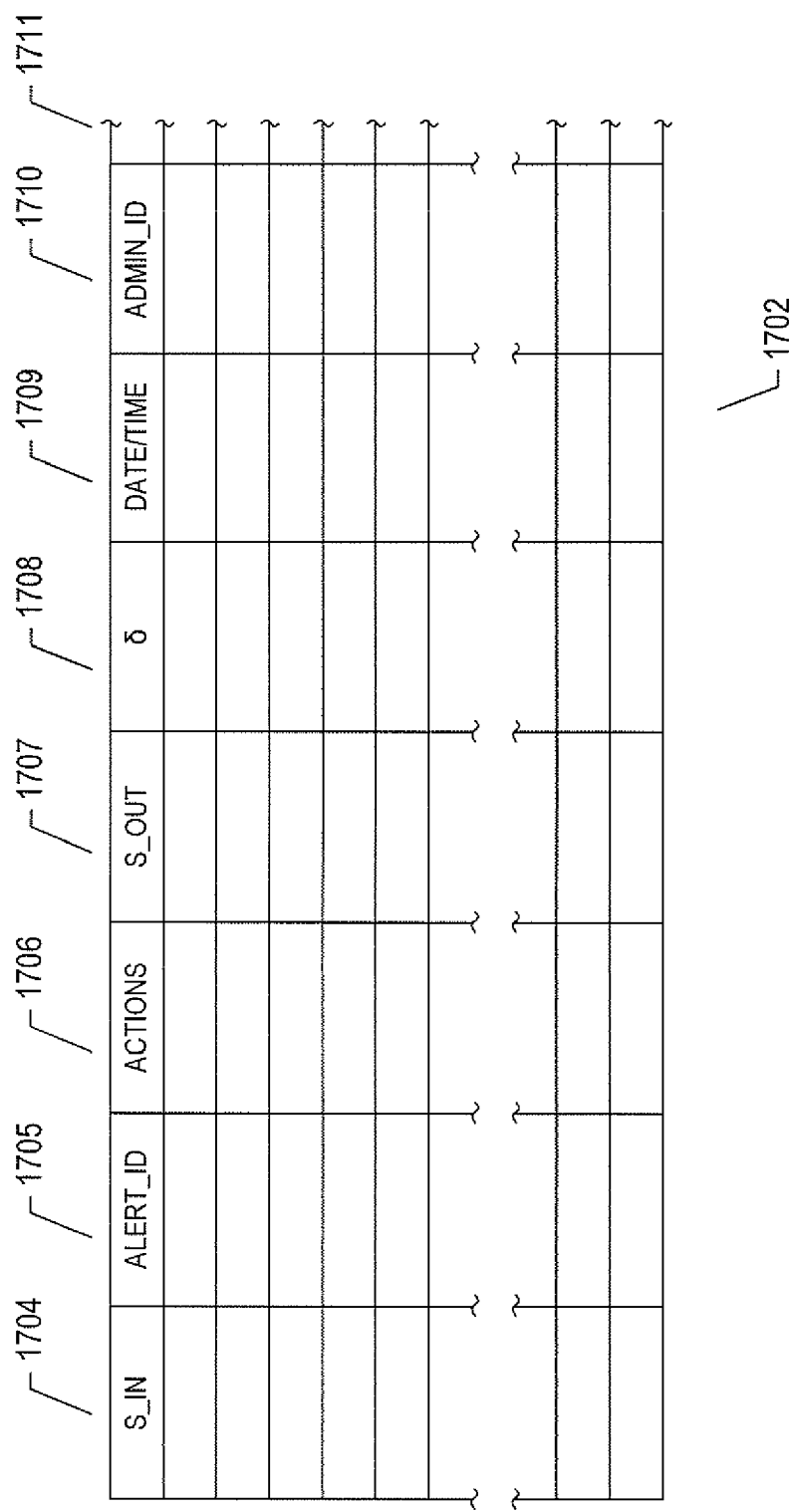
FIG. 17 illustrates one implementation of a database schema for storing information about previously observed states and previously applied remedial steps to drive the operational state of a computing facility back to an acceptable operational state.

FIG. 17 illustrates one implementation of a database schema for storing information about previously observed states and previously applied remedial steps to drive the operational state of a computing facility back to an acceptable operational state. The database schema is a single relational-database table 1702, each row of which represents a previously observed computing-facility operational state that generated an alert, the actions taken by a system administrator or by automated system-administration tools to address the observed operational state, and a desirability-metric value for the resultant computing-facility operational state following the actions taken by the system administrator or the automated system-administration tools. Specifically, each row contains values for each field represented by a column in the relational-database table 1702. The first column, S_IN 1704, contains a snapshot vector generated to represent the computing-facility operational state when the alert having an identifier stored in the second column, ALERT_ID 1705, occurred. The remedial actions taken by a system administrator or by automated administration tools in response to the alert are encoded in the field represented by column ACTIONS 1706. The fourth column, S_OUT 1707, contains a snapshot vector generated following application of the actions encoded in the field ACTIONS 1706. The fifth column 1708 contains a desirability metric computed from the snapshot vector stored in the field represented by the fourth column S_OUT. A six column 1709 contains a date and time, or timestamp, associated with the record and a seventh column 1710 contains an identifier for a system administrator or an instance of a system-administration tool associated with the record. The broken column 1711 represents any additional fields may be included in each row or record. Of course, there are many alternative database schemas and alternative database-storage methodologies for storing information about previously observed operational states and remedies applied to a computing system to address the previously observed operational states.

Figure 18:
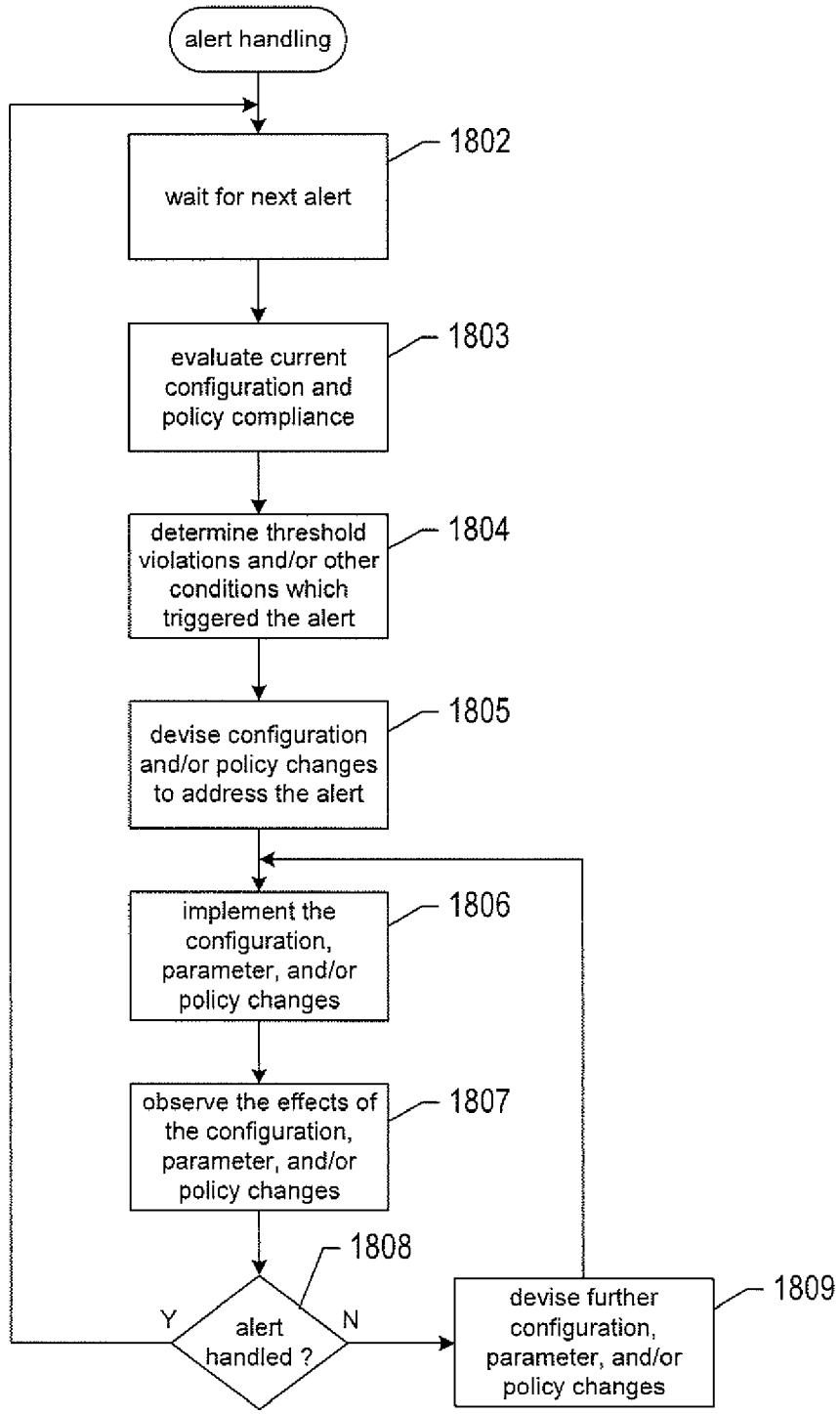
FIG. 18 shows a control-flow diagram that illustrates alert handling by conventional system administration.

FIG. 18 shows a control-flow diagram that illustrates alert handling by conventional system administration. Again, as explained above, for purposes of discussion, a simple alert-based system-monitoring and system-management method is used as an example. Various types of system-monitoring and system-management methods may employ additional functionalities, including non-real-time analysis of event logs, continuous monitoring of various system characteristics and system metrics, and even various types of artificial-intelligence-based analysis. Application of case-based reasoning and inference is similar to the application of case-based reasoning and inference to the simple alert-based system-monitoring and system-management used in the current discussion as an example.

The alert-handling method illustrated in FIG. 18 is implemented as a continuous alert-handling loop comprising steps 1802-1809. In step 1802, the method waits for a next alert to occur. Upon occurrence of a next alert, the alert-handling method evaluates current configuration and policy compliance, in step 1803. This generally involves manual evaluation by a system administrator. Certain types of alerts may be automatically filtered and certain types of preliminary data collection may be carried out automatically, by administration tools, to facilitate manual steps. In step 1804, the alert-handling method determines the set of threshold violations and/or other conditions or parameter values which triggered the alert. In step 1805, the alert-handling method devises configuration, parameter, and/or policy changes to address the operational state that generated the alert. In step 1806, the method implements the configuration, parameter, and/or policy changes. In step 1807, the method observes the effects of the configuration, parameter, and/or policy changes on the operational state of the computing facility. When the alert has been successfully handled, as determined in step 1808, control returns to step 1802, where the method waits for the occurrence of a next alert. Otherwise, in step 1809, the method devises further configuration, parameter, and/or policy changes to address whatever state the computing facility is now in and then returns to step 1806 to implement these further configuration, parameter, and/or policy changes. Of course, in any real-world implementation, the alert-handling method is multi-threaded so that many different alerts can be simultaneously or concurrently handled. For example, a significant period of time generally elapses between steps 1806 and 1807. It would be impossibly slow and inefficient for a real-world administration system to serially handle alerts, one-by-one, from occurrence to resolution. Thus, steps 1803-1809 are generally carried out in a separate thread or process for each newly occurring alert. Similarly, the alert-handling methods discussed below with reference to FIGS. 19-20 are also multi-threaded.

As discussed above, the conventional approach to alert handling, illustrated in FIG. 18, which is used as an example of conventional system-monitoring and system-management methodologies, is associated with many deficiencies. First, the method generally relies on the experience and knowledge of individual system administrators for correctly diagnosing undesirable operational states and devising plans for ameliorating those undesirable operational states. Because even modestly sized computing facilities are extremely complex, it is unlikely that even experienced system administrators are familiar with even a small fraction of the many different types of undesirable operational states that may occur, and even more unlikely that even an experienced system administrator would have a high probability of devising optimal or near-optimal strategies for handling even a small fraction of the possible undesirable operational states. Second, handling of undesirable operational states may be associated with significant and often deleterious delays. Quite often, serious pathological operational states can quickly devolve into system crashes, massive data losses, service interruptions, and other damage. It is imperative that these pathological operational states to be quickly ameliorated. When a system administrator needs to carry out extensive research into particular problems exposed by the alert-generation method, the time taken for the research, even using modern web-based information sources, is often far too long. Both the first and second types of deficiencies, discussed above, are products of the high complexity of computing facilities and the enormous numbers of different undesirable operational states and the enormous numbers of different types of remedial steps and actions that can be taken to ameliorate them. The total space of possible problems and corresponding solutions is enormous. It is generally far too large to hope for devising simple algorithmic methods for diagnosing and handling the various different events that trigger alerts.

One approach to addressing problem domains with the above-described characteristics of complexity and large problem/solution spaces is the use of case-based reasoning and inference. Case-based reasoning and inference involves maintaining a history of observed operational states that generated alerts, steps taken to handle the operational states, and indications of how well those steps were able to restore desirable operational states within a computing facility. A new alert is processed by attempting to find information about previous occurrences of the alert due to operational states similar to the operational state of the computing facility when the new alert occurred. Case-based reasoning and inference can be used too quickly acquire useful information for similar, past situations. This information can be used for facilitating diagnosing problems and devising solutions for the problems. Case-based reasoning and inference is different from attempting to exactly match a new problem to a previous problem and use the solution for the previous problem to handle the new problem. In huge problem/solution combinatorics spaces, it is infeasible to attempt to store templates or descriptions for all possible problems and corresponding solutions and essentially impossible to amass real data for all possible problems and corresponding solutions. Instead, case-based reasoning and inference is the process of drawing analogies and recognizing similarities to previously encountered problems and facilitating generation of strategies for handling the new problems.

Figure 19:
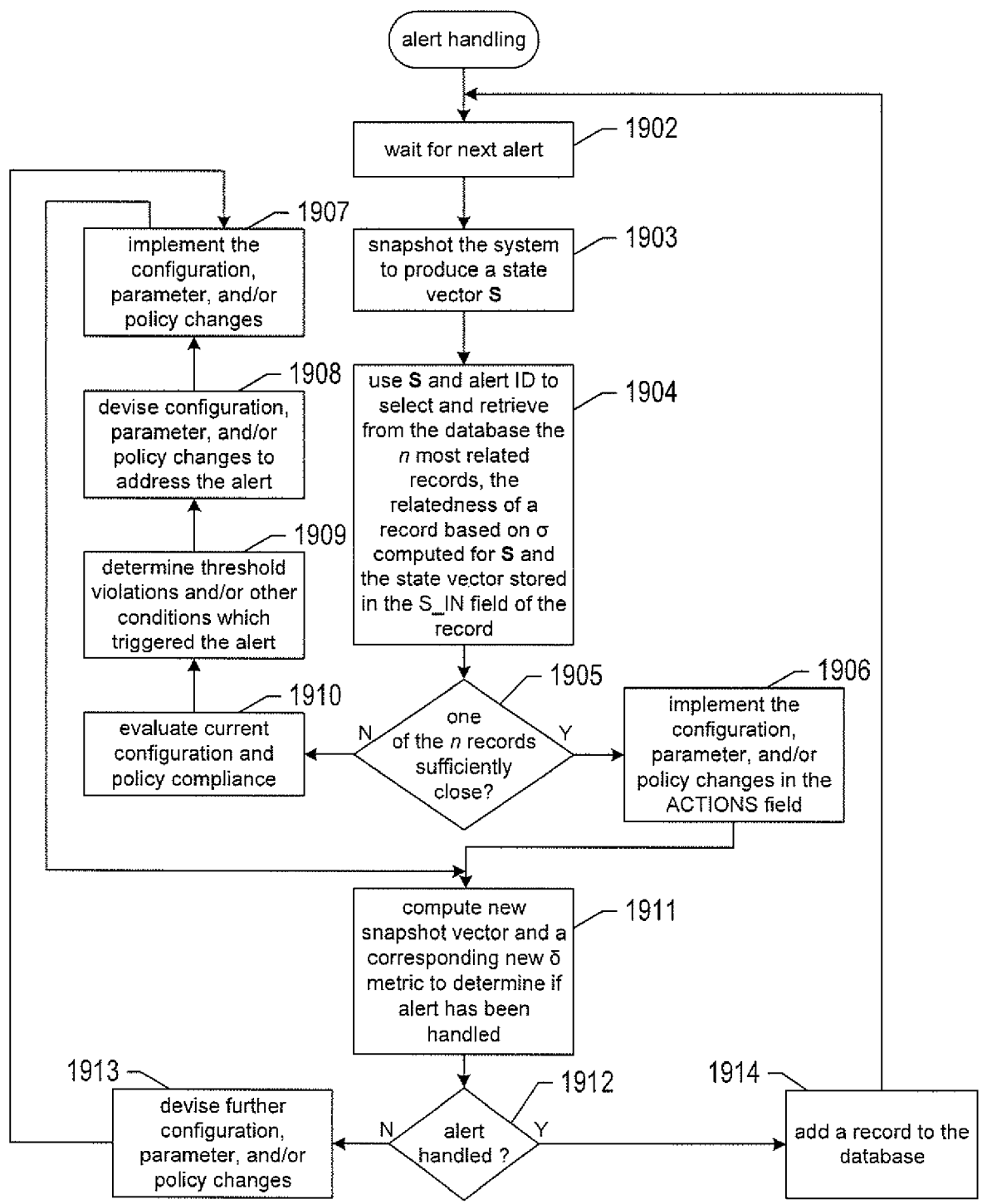
FIG. 19 illustrates use of case-based reasoning and inference to more accurately and efficiently handle alerts than the types of conventional methodologies illustrated in FIG. 18.
Figure 20:
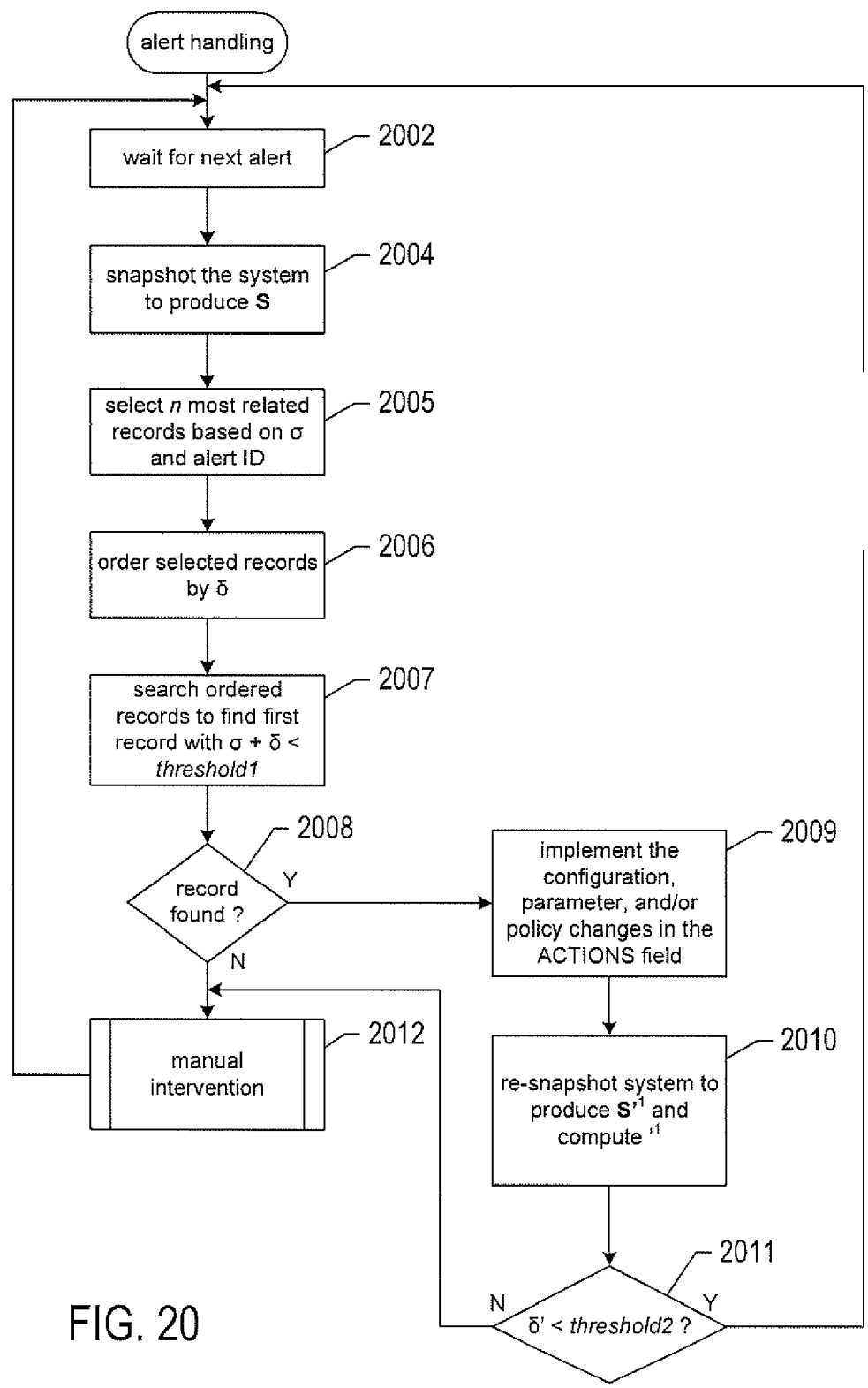
FIG. 20 provides a control-flow diagram for a more automated alert-handling method that incorporates case-based reasoning and inference.

FIG. 19 illustrates use of case-based reasoning and inference to more accurately and efficiently handle alerts than the types of conventional methodologies illustrated in FIG. 18. The alert-handling method illustrated in FIG. 19 is also implemented as a continuous loop in which the alert-handling method waits for the occurrence of a next alert, in step 1902, and then handles the alert in steps 1903-1914. In step 1903, the alert-handling method generates a snapshot vector for the computing facility, as described above with reference to FIG. 16, which represents the current operational state of the computing facility. Presumably, this current operational state is relatively close to the operational state in which the alert was initiated, since little time has generally elapsed since the alert was raised. In step 1904, a stored procedure is executed against the relational database table, discussed above with reference to FIG. 17, to retrieve, from the database, the records most related to the current alert and the snapshot vector generated in step 1903. The stored procedure uses a select query to select records that contain an alert identifier, in the field ALERT_ID, equal to the identifier of the current alert and then selects, from these records, n records for which a similarity metric σ computed from the state vector generated in step 1903 and the state vector contained in the field S_IN of the records has the smallest value. When similarity metric σ computed for one of these the selected records is sufficiently small, as determined in step 1905, the method implements the configuration, parameter, and/or policy changes encoded in the ACTIONS field of the record in order to address the current alert. Otherwise, in steps 1910-1907, the method devises and implements configuration, parameter, and/or policy changes similar to steps 1803-1806 in FIG. 18. However, in devising and implementing the configuration, parameter, and/or policy changes, the system administrator or automated administration tool uses the related records obtained in step 1904 in order to analogize and infer a strategy for addressing the current operational state of the computing facility based on the strategies encoded in the related records. Using the previous case histories in this fashion can significantly shorten the latency between alert occurrence and initiation of remedial steps and greatly increase the probability of identifying an effective approach to addressing the alert. In step 1911, the method generates a new snapshot vector for the system and a corresponding δ desirability metric in order to observe and quantify the results of the steps taken to ameliorate the undesirable operational state corresponding to the current alert. In step 1912, the method determines whether or not the alert has been handled. When the δ desirability metric is sufficiently small, the alert is considered to have been adequately handled. When the alert is not handled, as determined in step 1912, an additional set of configuration, parameter, and/or policy changes is devised, in step 1913, and applied in step 1907, following which an additional new snapshot vector is generated in step 1911. This process continues until the alert is handled, as determined in step 1912, at which point the steps taken to handle the alert are encoded within a new record added to the database, in step 1914, to facilitate handling of subsequent occurrences of the alert.

The accumulation of records in a database, such as the records and relational database table discussed above with reference to FIG. 17, over time, represents a type of learning. As the database grows larger and represents an ever greater coverage of the possible state-vector values, the likelihood of finding at least one record within a threshold distance, in operational-state space, of an input state vector increases. In addition, various additional techniques are employed, in certain implementations, to steer a case-based reasoning-and-inference subsystem within a computing-facility monitoring-and-management system towards greater accuracy and efficiency. For example, when multiple records accumulate for a particular state-vector value, those records for which the stored desirability metric, representing how well the event or condition was handled, is less than a threshold value may be coalesced into a single record that represents a consensus of the successful event-handling techniques, while those records with outcomes greater than the threshold may be removed. Many other techniques can be employed to filter and winnow the database contents, over time, to better represent the accumulated knowledge represented by the records stored in the database. Additional machine-learning techniques can be applied to the contents of the database in order to generate new rules, policies, and constraints based on the frequency of occurrence of particular types of events and methods employed to most effectively handle them. The new rules, policies, and constraints represent a higher-level type of learning that is achieved via case-based reasoning. When successfully adopted, the new rules, policies, and constraints may prevent future occurrences of the events that triggered their generation, so that, over time, the records related to handling of those events may become less and less frequently accessed. Additional filtering of the database may remove such stale events, particular stale events that provided the basis for introducing new rules, policies, and constraints. Thus, over time, a case-based reasoning-and-inference subsystem within a computing-facility monitoring-and-management system learns the operational characteristics and behaviors of the system, manual and automatically applied techniques tor addressing problems, and, as a result of the accumulated knowledge base, learns how to adapt and refine the system towards better efficiency and reliability.

There are, of course, many possible refinements and alternate steps that can be taken by the method. For example, the search for related records, in step 1904, may be refined to search not only for matching alert IDs in database records, but also for related alert IDs when information about the relatedness or similarity of alert IDs is available. Higher-level inference may be employed, in step 1906, to modify the configuration, parameter, and/or policy changes extracted from the retrieved record in the case that the snapshot vector S_IN in the retrieved record does not exactly match the snapshot vector generated in step 1903. Many inferential and artificial-intelligence methods may be applied to tailoring configuration, parameter, and/or policy changes used for handling a previous alert to create a plan for handling a current alert. These techniques may use differences in snapshot-vector-component values to infer alterations to the previously employed configuration, parameter, and/or policy changes.

FIG. 20 provides a control-flow diagram for a more automated alert-handling method that incorporates case-based reasoning and inference. As with the alert-handling methods discussed above with reference to FIGS. 18 and 19, the alert-handling method illustrated in FIG. 20 is implemented as a continuous alert-handling loop, with the alert-handling method waiting, in step 2002 for a next alert and then handling the next occurring alert in steps 2004-2011. In step 2004, a snapshot vector is generated to capture the current computing-facility state. In step 2005, the database is searched for n records most related to the snapshot vector generated in step 2004 and the identifier for the alert being processed. In step 2006, these records are ordered by an σ-metric value representing the similarity between the snapshot vector generated in step 2004 and the snapshot vector contained in the S_IN field of the n records. In step 2007, the n records are searched, beginning with the first record in the ordered set of records, to find a record with a search value equal to or less than a threshold value threshold1. The search value is the sum of the σ metric for the record and the desirability-metric value in the desirability-metric field of the record. If a record is found that meets this criterion, as determined in step 2008, then, in step 2009, the alert-handling method automatically implements the configuration, parameter, and/or policy changes extracted from the actions field of the identified record. In step 2010, the method generates a new snapshot vector $S_a'$ for the computing facility and computes a desirability metric δ' for the new snapshot vector. When the desirability metric δ' is less than a threshold value threshold2, as determined in step 2011, the alert-handling method considers the alert to have been properly handled, and control returns to step 2002. Otherwise, control flows to step 2012, in which manual system and administrator intervention is requested via alert distribution. Once the system administrator has handled the alert, using the manual method illustrated in FIG. 18 or the semi-automated method illustrated in FIG. 19, control returns to step 2002, where the alert-handling method waits for a next alert to occur. As discussed above with reference to FIG. 18, in real-world implementations, steps 2004-2012 are carried out by a thread or process specific for each occurring alert, so that multiple alerts that occur in quick succession are handled in parallel.

Although the present invention has been described in terms of particular embodiments, it is not intended that the invention be limited to these embodiments. Modification within the spirit of the invention will be apparent to those skilled in the art. For example, any of many different alternative implementations can be obtained by varying any of many different design and implementation parameters, including choice of hardware components and configurations of distributed computer systems, choice of programming languages, operating systems, virtualization layers, control structures, data structures, modular organization, and other such design and implementation parameters. While the currently disclosed implementation uses relational database for storing information regarding previously handled alerts, formatted files, non-relational databases, and other data-storage techniques may be instead use in alternative implementations. While use of case-based reasoning and inference is described with respect to a computer-facility monitoring and managing subsystem that reactively processes alerts generated from event messages, similar case-based reasoning and inference is also used in more elaborate computing-facility-monitoring-and-managing subsystems that not only process real-time alerts, but that also identify undesirable operational states within a computing facility by analyzing event logs and monitoring computing-facility operational parameters. In these more complex cases, however, case-based reasoning and inference is incorporated similarly to the incorporation of case-based reasoning and inference within the simple facility-monitoring-and-managing subsystem based on processing real-time alerts used as an example in the current document.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system comprising:
   at least one computing device comprising at least one processor;
   at least one memory comprising executable instructions, wherein the instructions, when executed by the at least one processor, cause the at least one computing device to at least:
      receive an alert for a computing facility, the alert comprising an alert identifier and an operational state snapshot for the alert;
      identify, based on the alert identifier, a plurality of operational state records of successfully handled events, wherein the plurality of operational state records match the alert based on an alert field parameter that matches the alert identifier;
      search the plurality of operational state records to identify an operational state record of a successfully handled event for which a search value is under a predetermined threshold, the search value being generated using a similarity metric calculated for the operational state record and a desirability metric stored in a desirability field of the operational state record, wherein the similarity metric is calculated based at least in part on a square root of a scalar product of a difference vector with itself, the difference being between a first snapshot vector for the operational state snapshot for the alert and a second snapshot vector for the operational state record; and
      implement a remedial action in the computing facility to resolve the alert, wherein the remedial action comprises an action encoded in an actions field of the operational state record.

2. The system of claim 1, wherein the search value corresponds to a sum of the desirability metric and the similarity metric.

3. The system of claim 1, wherein the remedial action is verified to resolve the alert based at least in part on an operational state of the computing facility being confirmed to be a threshold distance outside of a closed surface of an enclosed n-dimensional volume of desirable operational states for the computing facility once the remedial action is implemented.

4. The system of claim 1, wherein the remedial action comprises at least one of: a configuration, parameter, and a policy change.

5. The system of claim 1, wherein the instructions, when executed by the at least one processor, cause the at least one computing device to at least:
   calculate an updated desirability metric for the computing facility once the remedial action is implemented, the updated desirability metric being calculated based on a snapshot vector for the computing facility once the remedial action is implemented.

6. The system of claim 5, wherein at least one additional remedial action is taken and at least one additional desirability metric is calculated until a current desirability metric indicates that the computing facility is in a desirable operational state.

7. The system of claim 5, wherein the updated desirability metric indicates that the computing facility is in an acceptable operational state based on the snapshot vector for the computing facility being within a threshold distance from a surface of an enclosed n-dimensional volume of desirable operational states for the computing facility.

8. A method implemented by instructions executed by at least one computing device, the method comprising:
   receiving an alert for a computing facility, the alert comprising an alert identifier and an operational state snapshot for the alert;
   identifying, based on the alert identifier, a plurality of operational state records of successfully handled events, wherein the plurality of operational state records match the alert based on an alert field parameter that matches the alert identifier;
   searching the plurality of operational state records to identify an operational state record of a successfully handled event for which a search value is under a predetermined threshold, the search value that is identified using a similarity metric and a desirability metric stored in the operational state record, wherein the similarity metric is calculated based at least in part on a difference vector between a first snapshot vector for the operational state snapshot for the alert and a second snapshot vector for the operational state record of the successfully handled event; and
   implementing a remedial action in the computing facility to resolve the alert, wherein the remedial action comprises an action encoded in an actions field of the operational state record of the successfully handled event.

9. The method of claim 8, wherein the similarity metric is within a threshold similarity to the operational state snapshot for the alert.

10. The method of claim 8, wherein the remedial action is verified to resolve the alert based at least in part on an operational state of the computing facility being confirmed to be within a threshold distance from a closed surface of an enclosed n-dimensional volume of desirable operational states for the computing facility once the remedial action is implemented.

11. The method of claim 8, wherein the remedial action comprises at least one of: a configuration, parameter, and a policy change.

12. The method of claim 8, further comprising:
   calculating an updated desirability metric for the computing facility once the remedial action is implemented, the updated desirability metric being calculated based on a snapshot vector for the computing facility once the remedial action is implemented.

13. The method of claim 12, wherein at least one additional remedial action is taken and at least one additional desirability metric is calculated until a current desirability metric indicates that the computing facility is in a desirable operational state.

14. The method of claim 12, wherein the updated desirability metric indicates that the computing facility is in an acceptable operational state based on the snapshot vector for the computing facility being within a threshold distance from a closed surface of an enclosed n-dimensional volume of desirable operational states for the computing facility.

15. A non-transitory computer-readable medium comprising executable instructions, wherein the instructions, when executed by at least one processor, cause at least one computing device to at least:
- receive an alert for a computing facility, the alert comprising an alert identifier and an operational state snapshot for the alert;
- identify, based on the alert identifier, a plurality of operational state records that match the alert based on an alert field parameter that matches the alert identifier;
- select, from the plurality of operational state records, an operational state record based at least in part on a similarity metric calculated between the operational state snapshot for the alert and an operational state vector of the operational state record;
- implement a remedial action in the computing facility to resolve the alert, wherein the remedial action comprises an action encoded in an actions field of the operational state record; and
- verify that the alert is resolved by at least one remedial action comprising the remedial action, based at least in part on an operational state vector of the computing facility calculated to be within a threshold distance from a closed surface of an enclosed n-dimensional volume of desirable operational states for the computing facility.

16. The non-transitory computer-readable medium of claim 15, wherein the similarity metric is within a threshold similarity.

17. The non-transitory computer-readable medium of claim 15, wherein the similarity metric is a square root of a scalar product of a difference between a first snapshot vector for the operational state snapshot and a second snapshot vector for a respective one of the operational state record and itself.

18. The non-transitory computer-readable medium of claim 15, wherein the remedial action comprises at least one of: a configuration, parameter, and a policy change.

19. The non-transitory computer-readable medium of claim 15, wherein the instructions, when executed by the at least one processor, cause the at least one computing device to at least:
- calculate an updated desirability metric for the computing facility once the remedial action is implemented, the updated desirability metric being calculated based on a snapshot vector for the computing facility once the remedial action is implemented.

20. The non-transitory computer-readable medium of claim 15, wherein at least one additional remedial action is taken and at least one additional desirability metric is calculated until a current desirability metric indicates that the computing facility is in a desirable operational state.

* * * * *